United States Patent
Such

(10) Patent No.: US 11,220,040 B2
(45) Date of Patent: Jan. 11, 2022

(54) EDGE MODIFICATION METHOD AND APPARATUS

(71) Applicant: LA TRAVIATA LIMITED, Auckland (NZ)

(72) Inventor: Duncan Karl Such, Auckland (NZ)

(73) Assignee: LA TRAVIATA LIMITED, Auckland (NZ)

( * ) Notice: Subject to any disclaimer, the term of this patent is extended or adjusted under 35 U.S.C. 154(b) by 79 days.

(21) Appl. No.: 16/638,672

(22) PCT Filed: Aug. 16, 2018

(86) PCT No.: PCT/IB2018/056149
§ 371 (c)(1),
(2) Date: Feb. 12, 2020

(87) PCT Pub. No.: WO2019/035017
PCT Pub. Date: Feb. 21, 2019

(65) Prior Publication Data
US 2021/0197443 A1    Jul. 1, 2021

(30) Foreign Application Priority Data
Aug. 17, 2017   (NZ) ........................ 734731

(51) Int. Cl.
*B29C 63/00* (2006.01)
*B27D 5/00* (2006.01)
*B29L 31/44* (2006.01)

(52) U.S. Cl.
CPC .......... *B29C 63/0026* (2013.01); *B27D 5/003* (2013.01); *B29C 63/0004* (2013.01); *B29C 2793/0027* (2013.01); *B29L 2031/44* (2013.01)

(58) Field of Classification Search
CPC .............. B29C 63/0026; B29C 63/003; B29C 63/0034; B29C 63/0039; B29C 63/0073; B29C 63/04; B29C 63/042; B29C 63/0004; B29C 66/83411; B29C 66/83415; B29C 66/8362; B29C 66/9241; B29C 66/96; B29C 2793/0027; B29C 2793/009; B29C 2063/485; B29C 66/92441; B29C 66/92431; B29C 66/9261; B29C 66/9292; B27D 5/003; B29L 2031/44; B32B 41/00; B32B 2041/06
USPC ........................................... 156/64; 700/123
See application file for complete search history.

(56) References Cited

U.S. PATENT DOCUMENTS

| | | | |
|---|---|---|---|
| 5,113,677 A | 5/1992 | Blunier et al. |
| 5,246,533 A | 9/1993 | Mochizuki |
| 6,263,938 B1 | 7/2001 | Maioli et al. |
| 7,243,696 B2 | 7/2007 | Such |

(Continued)

FOREIGN PATENT DOCUMENTS

| | | |
|---|---|---|
| DE | 3517194 | 11/1986 |
| DE | 35 17 165 | 1/1988 |

(Continued)

*Primary Examiner* — John L Goff, II
(74) *Attorney, Agent, or Firm* — Leason Ellis LLP

(57) ABSTRACT

An improved method of edge modification such as edge banding comprising placing a roller in contact with an edge and measuring a first position of the roller. Subsequently moving the contact roller along the edge to a second position and measuring the second position before calculating a desired force direction from the first and second position measurements, applying a force via the pressure roller in the desired force direction.

18 Claims, 14 Drawing Sheets

(56) References Cited

U.S. PATENT DOCUMENTS

2004/0011460 A1   1/2004   Such
2007/0006970 A1   1/2007   Such

FOREIGN PATENT DOCUMENTS

| DE | 3702154      | 8/1988  |
| DE | 3914461      | 11/1990 |
| DE | 102014203651 | 8/2014  |
| EP | 0728561      | 8/1996  |
| EP | 945235       | 9/1999  |
| EP | 2 433 745    | 3/2012  |

EDGE MODIFICATION METHOD AND APPARATUS

CROSS-REFERENCE TO RELATED PATENT APPLICATIONS

This application is a U.S. National Phase Application under 35 U.S.C. § 371 of International Patent Application No. PCT/IB2018/056149, filed Aug. 16, 2018, which claims the priority of NZ Patent Application 734731, filed Aug. 17, 2017, each of which is incorporated by reference as if expressly set forth in their respective entirety herein.

FIELD OF THE INVENTION

The present invention relates to an edge modification method and apparatus, and in particular although not solely to an edge modification method and apparatus for applying an edging tape or edge band to furniture components or panels or other objects.

BACKGROUND

It is known to apply edging around the perimeter of tables or other panels or objects used in the construction of furniture. Such edging, whether wood veneer, plastic, melamine or high pressure laminate, affords furniture such as table tops a degree of durability and wear resistance that would otherwise be non-existent if no edging were to be applied. It also enhances the appearance of such objects. It is common for edging to be applied continuously using a variety of different techniques which vary in their complexity, cost, and reliability.

Hand lay-up techniques are most common but usually demand a certain amount of skill on the part of the operator. Such techniques have the disadvantage of creating variability in the final product as the degree of adhesion is reliant upon the pressing force applied to the edging during deposition as well as the orientation of the force in relation to the edge of the object. Hand laying techniques are also labour intensive and can be expensive for large volume work. Alternative techniques rely upon modern CNC (Computer Numerical Control) of a presser head. CNC machines rely on pre-programmed information on the shape of the object to follow its contour and simultaneously apply the tape. Such systems tend to be costly and slow, with machining of the edge necessary prior to the application of the edging, in order to ensure the path the machine follows is commensurate with the object Other edge modification machines use sensors or sensing mechanisms that precede a tape applying assembly. The tape applying assembly generally includes a tape laying assembly that lays edge tape on or along the edge and also includes some type of pressure applying mechanism. One example of a pressure applying mechanism is a roller that applies pressure to push the edging tape against the edge of a panel or an object.

U.S. Pat. No. 7,243,696 discloses one exemplary edge modification apparatus that includes a contact roller that follows the contour of an edge or a panel or other object, a force applicator that applies a vectored force to press the roller onto the edge of the panel. The apparatus also includes an edge sensor that determines the slope of the profile of the edge or at least determines a shape of the edge using suitable techniques. One example edge sensor disclosed in U.S. Pat. No. 7,243,696 comprises two rollers one trailing and one advanced roller that are engaged together via a linkage. The system includes a controller that controls a plurality of actuators that control the pressure applied by the contact roller to apply a pressure to the tape and edge such that the tape is adhered to the edge of the panel. The disadvantages of this system are the increased complexity of the edge sensor mechanism and the increased complexity of the chassis carrying the roller and the edge sensor due to the increased number of parts of the edge modification apparatus. The use of two rollers, leading and trailing the pressure roller can create problems with accuracy of the force vector the pressure is applied at. In particular due to the spacing of the two sensing rollers, the true radial angle (i.e. the normal force vector) of a central pressure roller is not represented. Hence, the radial angle (i.e. the force vector) of the pressure roller can often become advanced or retarded in respect to the true normal. The described two roller path sensing arrangement results in inaccuracies while applying pressure to the edge tape or edge band. Further there may be issues with wear and tear on the edge sensor thereby compromising the effectiveness of the edge sensor.

DE35171194 discloses an exemplary system to apply an edge tape or edging to a panel or other object that uses a sensor arm to determine the proximity of the aggregate to the work piece. This sensor arm determines the direction and velocity of each axis drive to cause the gluing/taping system to progress at constant speed around the work piece. The system also utilises advanced and trailing sensors to determine the angle and velocity of travel of the carriage. The disadvantages of this system are its complexity, the effort needed to load the turntable. Further the system includes additional parts and is dependent on the sensors and accurate sensing to be able to apply a force in the correct direction to apply the edge tape along an edge of the panel or object. Further using a sensing system that includes advanced and trailing sensors increases the cost of the apparatus due to the additional hardware components. Further the use of advanced and trailing sensors results in a somewhat inaccurate force vector calculation for the force to be applied to an edge of the panel, thereby retarding or advancing the angle of the force being applied. This requires compensation in the controller which can be complex and may make the process inaccurate and these inaccuracies can be heightened when applying edge tape around an internal or external corner of a panel.

DE 3914461 describes a system for loading a coil of tape on the aggregate so it is of minimal size and weight ensuring good following of the shape. The system includes a pressure roller to apply a pressure on the tape against an edge of the panel to apply the tape onto the edge. The pressure bias on the pressure roller is applied by a CNC controller to position the device proximate to the panel. The CNC controller is pre-programmed with the shape of the panel that is being edge banded. The disadvantages of this system are that it is an expensive solution and uses complicated and expensive technology and requires expert technicians to service it. Further the system cannot handle odd shaped or different shaped panels or objects. Each new shaped panel or object has to be pre-programmed limiting the speed of the edge banding process or limiting the use of this machine to edge banding panels or objects known. Other NC systems are also described in other prior art patent applications such as for example DE3702154, EP0728561 and EP945235. All these NC systems require pre-programming of the edge shape of a panel or object, thereby making the systems expensive to use and limiting the speed at which panels of varying shapes can be processed.

SUMMARY OF THE INVENTION

It is an object of the present invention to provide an edge modification apparatus and related method which will ameliorate one or more of the abovementioned disadvantages or which will at least provide the public with a useful choice.

In one aspect, the present disclosure relates to a method of edge modification to modify an edge of an object comprising the steps of:
placing a roller in contact with an edge of the object,
determining co-ordinates of a first position of the roller,
moving the roller along the edge from the first position to a second position,
determining co-ordinates of the second position of the roller,
calculating a desired force direction from the first position co-ordinates and the second position co-ordinates,
applying a force, by a pressure roller, along the desired force direction at the second position.

Preferably the contact roller is the pressure roller.

The desired force direction is calculated from a vector angle between the first position and the second position of the roller.

The desired force direction is calculated by adding or subtracting a transform value to the vector angle.

The transform value is such that the desired force direction is substantially normal the vector angle.

Preferably the desired force direction is at an angle 90 degrees from the vector angle.

The vector angle is calculated from a differential position between the second position and the first position.

Preferably the vector angle is calculated by applying a trigonometric function to a differential position.

Preferably the trigonometric function is an inverse tangent.

The first position and second position are defined by a pair of coordinates in a coordinate system.

Preferably the coordinate system is a Cartesian coordinate system and wherein the first position and second position are defined by an X coordinate, and a Y coordinate.

The differential position comprises a difference of X coordinates of the second position and the first position, and a difference of Y coordinates of the second position and the first position.

The vector angle is calculated by applying an inverse tangent to the difference of the Y coordinates of the second position and the first position divided by the difference of the X coordinates of the second position and the first position.

Preferably the force applied along the desired force direction is of a predetermined magnitude.

Preferably a new position of the contact roller is sampled at regular intervals as the contact roller is moved along the edge, wherein the regular interval is less than or equal to approximately 5 mm. More preferably a new position of the contact roller is sampled at regular intervals as the contact roller is moved along the edge, wherein the regular interval is approximately 3 mm.

The desired force direction is calculated at each sampled new position of the contact roller. Preferably a predetermined force is applied by the pressure roller at each new sampled position along the desired force direction.

The method of edge modification comprises the additional steps of:
detecting a non-linear section of the edge of the object,
adjusting the speed of the contact roller based on the detected non-linear section of the edge.

Preferably detecting a non-linear section of the edge is based on a change in the vector angle or desired force direction.

More preferably detecting the non-linear section of the edge is based on a rate of change of the vector angle as the contact roller moves along the non-linear section.

Preferably speed of the contact roller along a non-linear section of the edge is less than the speed of the contact roller along a linear section of the edge.

In some instances the speed of the contact roller may be increased on some non-linear geometries of the edge or may be higher on some non-linear sections as compared to linear sections of the edge.

The speed of the contact roller is less on a non-linear section when the non-linear section is calculated to be an internal corner or an external corner.

The method of edge modification comprises the additional steps of:
providing a cutter assembly comprising one or more cutters configured move along the edge to trim excess edge band, the cutter assembly pivotable from the roller, and;
applying a predetermined torque to the cutter assembly such that the cutter assembly is held against the edge of the object to allow the cutters to trim excess edge band.

Preferably the predetermined torque applied to the cutter assembly is based on a shape of the edge of the object.

The method of edge modification comprises providing a sensing roller spaced apart from and preceding the pressure roller, the sensing roller configured to move along the edge of the object from a first position to a second position, and wherein the contact roller is the sensing roller.

The method of edge modification comprises the additional steps of providing a trailing roller being spaced apart from and trailing the pressure roller, the trailing roller being pivotable relative to the pressure roller, and applying a contact force to the edge by a trailing roller.

Preferably the contact force applied to the trailing roller is based on a shape of the edge.

In another aspect, the present disclosure relates to an edge modification apparatus to modify an edge of an object comprising
a fixed structure to which the object is mounted,
a chassis,
a force application arrangement coupled to the chassis and arranged to move the chassis relative to the object
a roller assembly mounted to the chassis, the roller assembly including a roller, placed in contact with an edge of the object and moveable along the edge of the object,
an electronic controller configured to:
determining co-ordinates of a first position of the roller,
cause the roller to move along the edge from a first position to a second position,
determining co-ordinates of a second position of the roller,
calculate a desired force direction from the first position co-ordinates and the second position co-ordinates,
control the force application arrangement to apply a force, by a pressure roller, along the desired force direction at the second position.

Preferably the contact roller is the pressure roller.

The controller is configured to calculate the desired force direction from a vector angle between the first position and the second position of the roller.

The controller is configured to calculate the desired force direction by adding or subtracting a transform value to the vector angle.

Preferably the desired force direction is at 90 degrees from the vector angle.

The controller is configured to calculate the vector angle from a differential position between the second position and the first position.

The controller is configured to calculate the vector angle by applying a trigonometric function to a differential position.

Preferably the trigonometric function is an inverse tangent.

The first position and the second position are defined by a pair of coordinates in a coordinate system.

Preferably the coordinate system is a Cartesian coordinate system and wherein the first position and the second position are defined by an X coordinate, and a Y coordinate.

The differential position comprises a difference of the X coordinates of the second position and the first position, and the difference of the Y coordinates of the second position and the first position; and wherein the controller is configured to calculate the differential position at a second position as the roller moves from a first position to a second position.

The controller is configured to calculate the vector angle by applying an inverse tangent to the difference of the Y coordinates of the second position and first position divided by the difference of the X coordinates of the second position and the first position.

The controller controls the force application arrangement to cause the pressure roller to apply a predetermined force along the desired force direction.

The edge modification apparatus comprises;
one or more position sensors configured to sense the position of the contact roller as the contact roller moves along the edge,
the one or more position sensors in electronic communication with the controller and transmitting the sensed position to the controller,
the one or more position sensors sensing the position of the roller at regular intervals, wherein the regular interval is less than or equal to approximately 5 mm.

Preferably the edge modification apparatus comprises;
one or more position sensors configured to sense the position of the contact roller as the contact roller moves along the edge,
the one or more position sensors in electronic communication with the controller and transmitting the sensed position to the controller,
the one or more position sensors sensing the position of the roller at regular intervals, wherein the regular interval is approximately 3 mm.

The controller configured to calculate the desired force direction at each new sensed position of the contact roller.

The controller configured to control the force application arrangement such that a predetermined force is applied by the pressure roller at each new sensed position along the desired force direction.

The edge modification apparatus further comprising;
a roller drive device in electronic communication with the controller and coupled to the roller to drive the roller along the edge at a predetermined speed,
wherein the controller is further configured to:
detect a non-linear section of the edge of the object,
control the roller drive device to adjust the speed of the contact roller based on the detected non-linear section of the edge.

The controller is configured to detect the non-linear section of the edge based on a change in the vector angle or desired force direction.

The controller is configured to detect the non-linear section of the edge based on a rate of change of the vector angle as the roller moves along the non-linear section.

The roller drive device is controlled to drive the contact roller such that the speed of the contact roller along a non-linear section of the edge is less than the speed of the contact roller along a linear section of the edge.

The roller drive device is controlled to drive the contact roller such that the speed of the contact roller is less on a non-linear section when the non-linear section is calculated to be an internal corner or an external corner.

The edge modification apparatus comprising;
a cutter assembly, the cutter assembly including,
one or more cutters to trim excess edge band or edge tape from the edge,
a cutter drive unit arranged to operate the one or more cutters,
the cutter assembly being spaced apart from and pivotable relative to the contact roller,
a cutter actuator capable of exerting a torque on the cutter assembly to pivot the cutter assembly relative to the contact roller,
wherein a predetermined torque is applied by the cutter actuator to the cutter assembly such that the cutter assembly is held against the edge of the object to allow the cutters to trim excess edge band or edge tape.

The controller controls the cutter actuator to apply a predetermined torque to the cutter assembly based on a shape of the edge of the object.

In one configuration the roller assembly comprises a sensing roller and a pressure roller;
wherein the sensing roller spaced apart from and preceding the pressure roller,
wherein the sensing roller configured to move along the edge from a first position to the second position, wherein the contact roller is the sensing roller, and;
the controller controlling the force application arrangement to apply a predetermined force by the pressure roller along the desired force direction when the pressure roller is at the second position.

The controller stores a predetermined spatial relationship between the sensing roller and the pressure roller, and the controller delaying application of the force by the pressure roller by a predetermined delay, wherein the predetermined delay is based on the predetermined spatial relationship between the sensing roller and the pressure roller.

The roller assembly further comprises a trailing roller,
the trailing roller depending from the pressure roller and pivotable relative to the pressure roller, and;
the trailing roller applying a contact force to the edge.

The controller is configured to control the contact force applied to the edge by the trailing roller is based on the shape of the edge.

The controller is configured to control the contact force such that the contact force applied by trailing roller on a non-linear section of edge is less than the contact force applied by the trailing roller on a linear section of the edge.

The edge modification apparatus further comprising;
a chassis drive device configured to apply a force to pivot the chassis about the pressure roller,
the trailing roller rigidly coupled to the chassis,
the contact force applied by the trailing roller is from the chassis drive device, and the controller configured to control the chassis drive device to vary the contact force applied by the trailing roller.

The controller comprises a processor and a non transitory memory unit, the memory unit stores computer readable instructions and the processor is configured to execute the computer readable instructions to determine the desired force direction.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner. This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both. The invention consists in the foregoing and also envisages constructions of which the following gives examples only.

BRIEF DESCRIPTION OF THE DRAWINGS

The present invention will now be described by way of example only and with reference to the accompanying drawings in which.

DETAILED DESCRIPTION OF A PREFERRED EMBODIMENT

In the broadest sense the apparatus as herein described may provide a multipurpose apparatus for modifying an edge of an object. The object may be any object such as a piece of furniture, a construction panel, or planar objects or any other objects that may require an edge modification. The edge modification generally entails applying an edge tape or an edge band to the object. Such edging may be wood veneer, plastic, melamine or high pressure laminate or any other suitable materials that are applied to the edge of the object to provide the object with increased durability and wear resistance that would otherwise be non-existent if no edge tape or edge band were applied.

The term "modification" as used herein is meant to include any one or more of the following; cutting, trimming, sanding, smoothing, gluing, painting and deposition of edging, and other possible processes. While particular emphasis is given to the capability of the apparatus in respect to applying edge tape or an edge band to the edge profile of an object, it should not be considered as being exclusively for this purpose.

Figure 1:
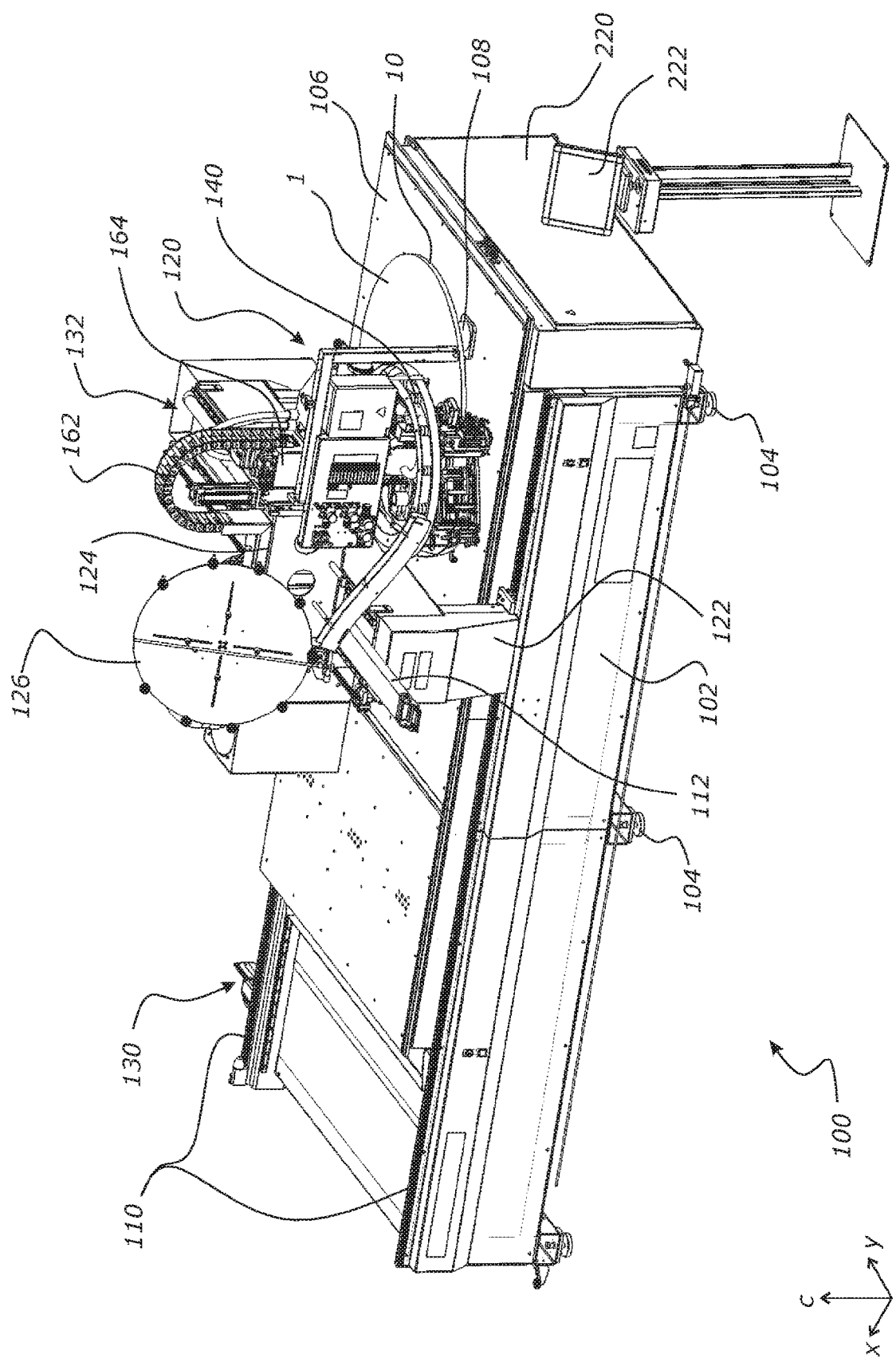
FIG. 1 shows an exemplary embodiment of an edge modification apparatus in accordance with the present invention.
Figure 2:
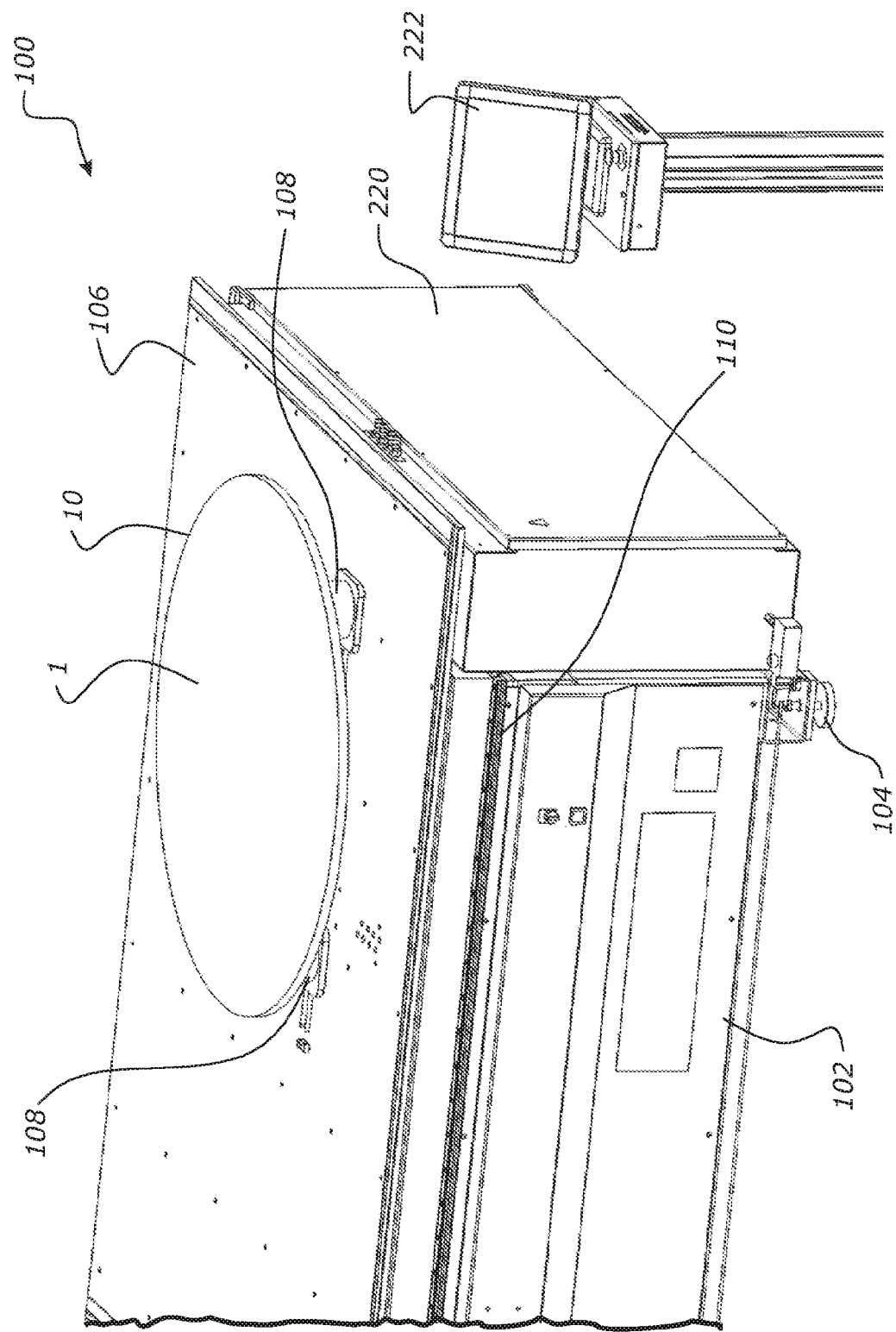
FIG. 2 shows a view of the bed with supports configured to support an object in an operational position

FIGS. 1 and 2 show an exemplary embodiment of an edge modification apparatus in accordance with the present invention. FIGS. 1 and 2 show an edge modification apparatus 100 particularly, but not exclusively, suited for edge banding i.e. applying an edge tape or edge band to an object such as a panel or a piece of furniture. Other objects can also be edge modified by the edge modification apparatus and method as described herein.

Figure 3:
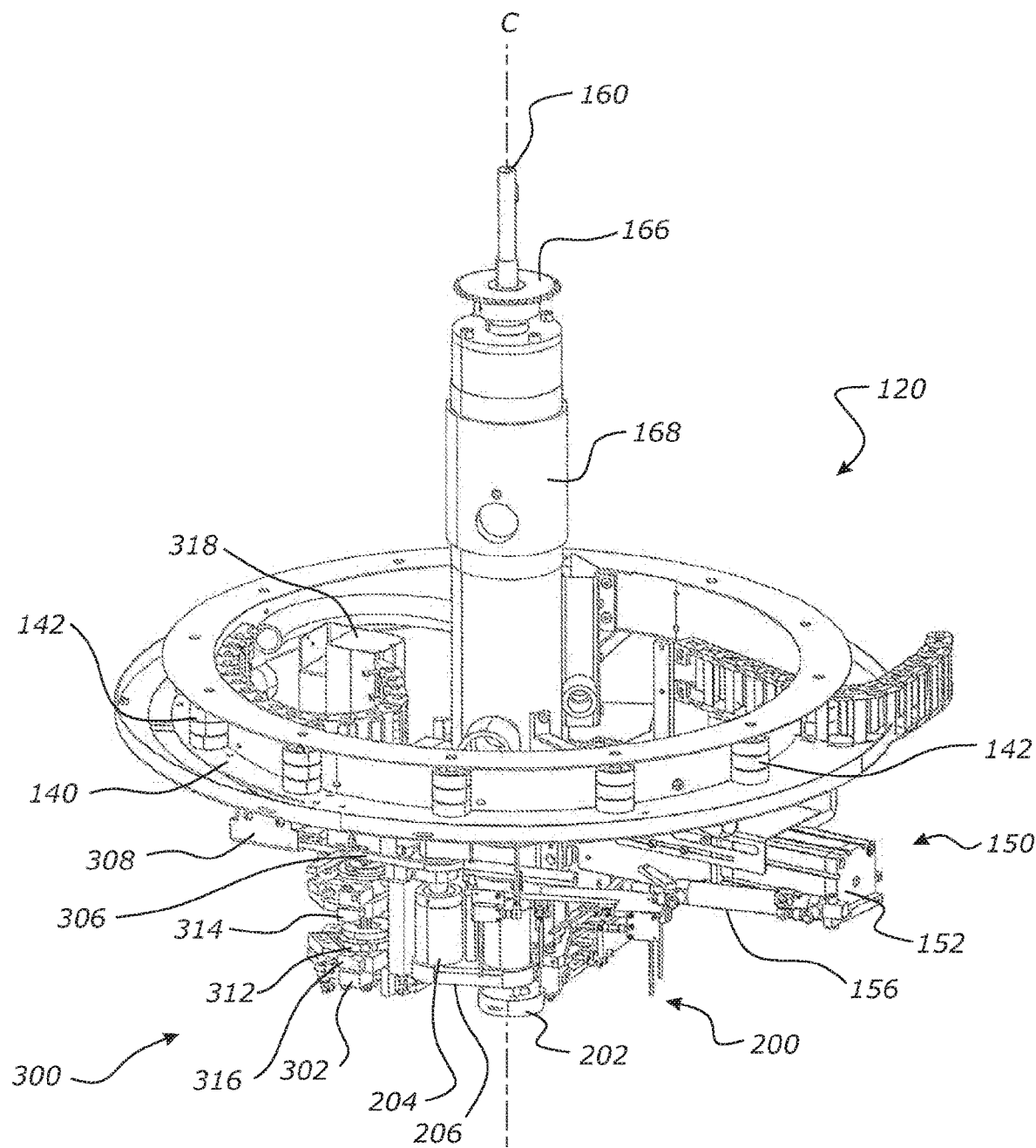
FIG. 3 shows a view of the chassis of the edge modification apparatus of FIG. 1 and its components.
Figure 4:
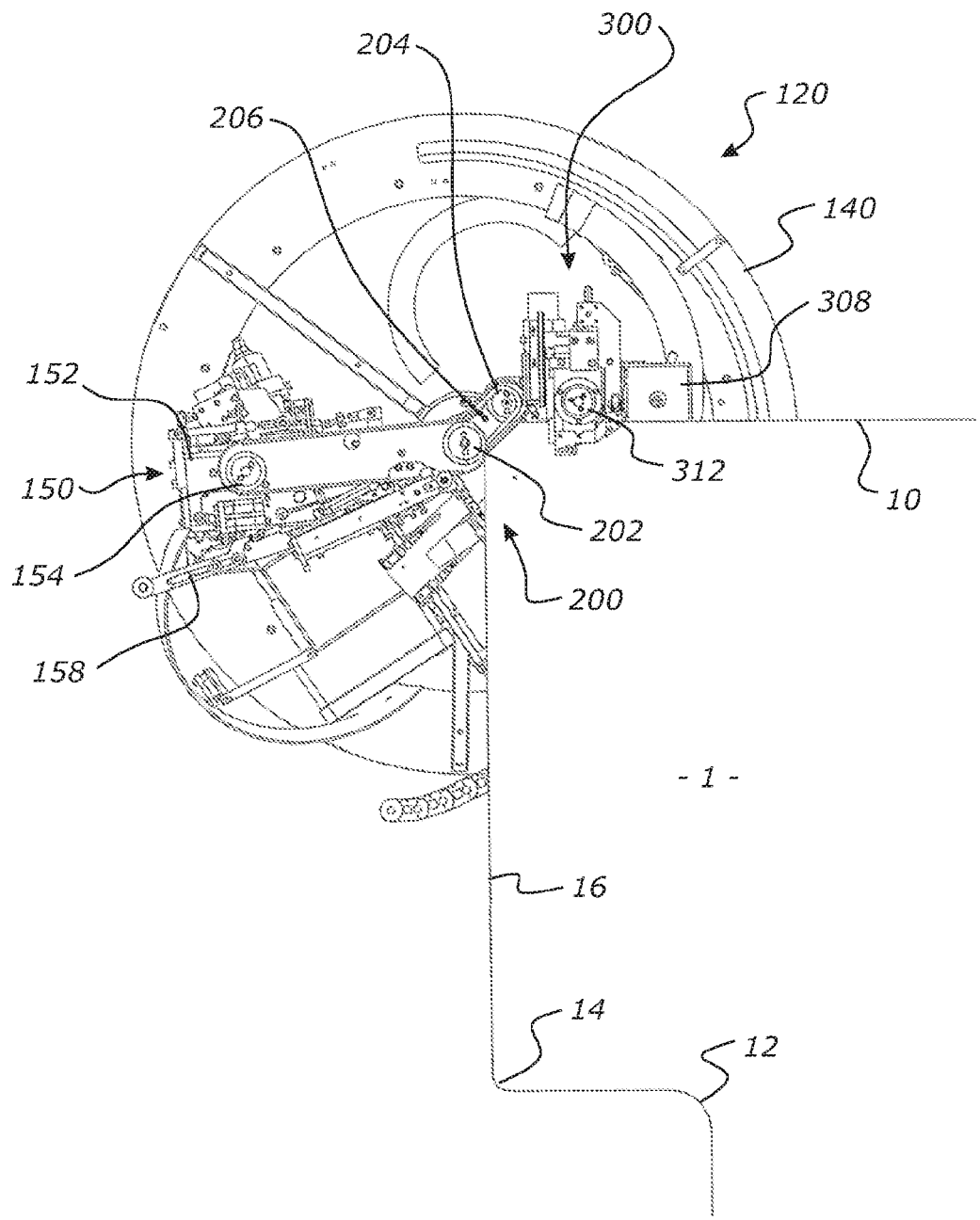
FIG. 4 shows an underside view of the chassis of the edge modification apparatus of FIG. 1 against an object.

FIG. 1 shows an embodiment of the edge modification apparatus 100. FIGS. 2-4 show views of parts of the edge modification apparatus 100. Referring to FIG. 1, the apparatus 100 comprises a base structure 102. The base structure 102 comprises one or more legs 104 that carry the base structure 102. The base structure 102 includes a bed 106. The bed 106 may be a flatbed structure and rests on the base structure 102. Alternatively the bed 106 may be a pod and rail arrangement or potentially some kind of transfer loading table.

The bed 106 includes one or more supports 108 configured to support a panel in an operational position. As seen in FIG. 2 the platform 106 includes a plurality of supports 108 configured to retain a work piece such as panel 1. In one exemplary form the supports are vacuum cups or suction cups that retain and hold the object 1 in an operational position. Alternatively the supports 108 may include other removable retention features such as clips or clamps or the like. The supports 108 retain the panel 1 in an operational position such that the edge modification apparatus 100 can modify the edge 10 of the panel 1. For example by applying an edge tape or edge band to the edge 10.

The apparatus 100 comprises one or more longitudinal rails 110 extending substantially longitudinally along the base structure 102. In the illustrated embodiment of FIG. 1, the apparatus 100 comprises two parallel longitudinal rails 110. The apparatus 100 further comprises one or more transverse rails 112. In the illustrated embodiment the apparatus 100 comprises a single transverse rail 112 extending transversely across the platform 106.

The edge modification apparatus comprises a chassis 120. The chassis 120 is made from a rigid material such as a metal for example steel, or stainless steel or any other suitable rigid, durable material. The chassis 120 supports a plurality of other components. These components of the chassis 120 may be made of a suitable material such as for example steel or alternatively some of the components may be made of plastics material. Preferably the components are made of a durable material.

The chassis 120 is moveable relative to the panel 1 in an at least two directions. The chassis 120 is mounted to a carriage 122. The carriage 122 is moveably mounted on the longitudinal rails 110 such that the carriage can move or translate along the rails parallel to a longitudinal axis of the base structure 102. The chassis 120 is also connected to a frame 124. The frame 124 is moveably mounted to the transverse rail 112 such that the frame 124, and the connected chassis 120 can also move along the transverse rail along a transverse axis. The movement of the carriage 122 and the frame 124 move the chassis 120 in two dimensions. The chassis 120 can also rotate about its own vertical axis that is parallel to a vertical C axis.

The frame 124 supports a spool 126 of edge tape or edge band. The spool 126 is rigidly connected to the frame 124 and may be rotatable about a shaft that is connected to and extends laterally across the frame 124. The spool 126 provides a supply of edge tape or edge band through a channel, across a glue head and onto an edge 10 of the panel 1 for adhesion on to the edge 10. The spool 126 also includes a replaceable magazine or reel that can be inserted into the spool 126. Preferably the edge tape or edge band is pulled from the spool during operation by a roller such as a tape feed roller (described later).

Alternatively the spool 126 may be coupled to a spool motor that may be configured to rotate the spool 126 at a desired speed to provide an adequate feed rate of tape. The spool motor may be any suitable motor and may be controlled by any suitable drive such as a variable speed drive. Preferably the operation of the spool tape is controlled by the controller 220. The spool motor may be a PLC or variable speed drive controlled motor. The spool motor may also be located in any suitable location.

The edge modification apparatus 100 further comprises a force application arrangement coupled to the chassis 120 and configured to move the chassis 120 such that a force can be applied to the edge via a roller.

The force application arrangement comprises a first motor 130 and a second motor 132. The first motor 130 (partially obscured from view) is connected to the carriage 122 and drives the carriage along the longitudinal rails 110. The second motor 132 (obscured from view) is connected to frame 124 and drives the frame 124 along the transverse rail 112. The second motor 132 is generally illustrated in FIG. 1 and may be in any suitable location, such as tucked under behind the spool 126. The first motor 130 may also be in any suitable location on the apparatus 100. The first motor 130 and the second motor 132 are controlled by variable speed drives. The variable speed drives are configured to operate in multiple modes, wherein one mode is a torque mode. The variable speed drives can control the first motor 130 and second motor 132 to act as vector drives. The variable speed drives may be located within a casing 134. The first and second motors are configured to move the chassis 120 and hence the roller 202 relative to the object in at least two dimensions i.e. parallel to the longitudinal rails or the transverse rail. The first motor 130 and second motor 132 are configured to move the chassis relative to the object 1. The first and second motors 130, 132 may be any suitable motors and include other components that allow operation of the motors and movement of the carriage 122 and the frame 124. For example timing belts or rack and pinion mechanisms can be used.

The variable speed drives are configured for use in accurate torque control of the first and second motors 130, 132 i.e. can function to apply a controlled torque. This is a convenient way to apply a controlled force to the contact roller and hence allow the roller to apply a controlled force to an edge of the object 1. The first motor 130 controls movement of the chassis 120 and contact roller 202 along the longitudinal rails 110. The second motor 132 controls the movement of the chassis 120 and roller 202 in the along the transverse rail 112.

In the illustrated example of FIG. 1 the longitudinal rails 110 represents movement in the X direction or parallel to an X axis. The transverse rail 112 represents movement in the Y direction or parallel to a Y axis. Therefore the first motor 130 controls the X position and the second motor 132 controls the Y position of at least the contact roller 202. In the illustrated embodiment the X axis is parallel to the longitudinal rails 110 and the Y axis is parallel to the transverse rail 112. The use of the Cartesian system will be described later. It is also contemplated that other coordinate systems can be used for determining position of the roller 202 as described later. As shown in FIG. 3 the chassis 120 comprises a central shaft 160 i.e. a C axis shaft. A vertical C axis is shown in FIG. 3. The chassis 120 is rotatable about the C axis shaft 160. The contact roller 202 is mounted directly to the C axis shaft. The edge modification apparatus 100 comprises a roller drive device and a chassis drive device. In the illustrated example the roller drive device is a C axis motor 162 that rotates the shaft 160 to drive the contact roller 202. The chassis drive device is a chassis drive motor 164 that is mounted adjacent the C axis shaft 160.

The chassis drive motor 164 may be mounted on the frame 124. The chassis drive motor 164 is configured to drive the chassis and rotate the chassis about the C axis shaft 160. The chassis drive motor 164 and C axis motor 162 can be any suitable motor and can be controlled by any suitable controller such as a variable speed drive or a PLC or any other suitable motor controller. The central shaft 160 also comprises a sprocket 166 that couples to a drive assembly such as a belt or chain drive (not shown for clarity). The drive assembly is coupled to and driven by the chassis drive motor 164. The sprocket 166 transmits the motion or forces from the chassis drive motor 164 to the chassis 120 and rotates or moves the chassis 120 relative to the central shaft 160 i.e. around the C axis.

The edge modification apparatus 100 comprises a sheath 168 that encases the central shaft 160. The sheath 168 may be formed from a durable, rigid material such as a steel or stainless steel or any other suitable material. The chassis 120 is rigidly coupled to the sheath 168 by connecting rods or connecting arms or other suitable connectors or fasteners.

The sheath 168 is rotatable about the shaft 160 and the shaft 160 passes through the sheath 168. The sheath 168 preferably rotates due to a driving force from the sprocket 166 and thereby causes the chassis 120 to rotate or move relative to the central shaft 160. The sheath 168 is preferably runs inside large bearings which are mounted on the chassis 120, in which the sheath can rotate. The central shaft 160 can rotate independently and is driven by its own separate motor 162.

Referring to FIGS. 3 and 4 there is shown a detailed view of the chassis 120 and the various components supported by the chassis 120. The chassis 120 comprises a channel 140 to guide the tape past a glue head 150 and onto the edge 10. The channel 140 may comprise a plurality of runners or wheels 142 that prevent the tape from tangling with within the channel 140 and also reduce the tape from catching or getting stuck within the channel 140.

The chassis comprises a glue head 150 that is an assembly of a plurality of components that houses glue and provides the glue to the edge tape or edge band prior to the edge tape or edge band being laid onto the edge 10 of the object 1. The glue head 150 and its components are mounted to the chassis 120 using any suitable mounting fasteners or other coupling arrangements. The glue head 150 may be moveable relative to the object 1 as the chassis 120 moves.

The glue head 150 comprises glue cartridge 152 that acts as a glue reservoir and holds a volume of glue. The glue cartridge 152 may be a replaceable cartridge such that the cartridge is replaced when the cartridge is emptied. Alternatively the glue cartridge may be a refillable cartridge. The cartridge 152 may be a pressurised cartridge or may include an actuator to push glue out at a desired rate and volume. The glue head 150 includes a plurality of glue nozzles that extrude glue onto the edge tape or edge band as the edge tape or edge band is dragged in contact with or adjacent the glue nozzles. For clarity the nozzles are not shown in the current figures. Alternatively the glue head 150 may comprise any other suitable applicator The glue head 150 may alternatively comprise a glue melting pot and roller system similar to other glue applicator systems that can be used in edge banding. The nozzle and cartridge system as described above are advantageous over conventional glue heads because of the compact design and the ability to apply glue in localized areas of the edge band or edge tape that match the panel rather than across the entire band.

The glue head comprise a tape feed roller 154. As seen in FIG. 4, the glue head 150 includes a tape feed roller 154. The tape feed roller is preferably a driven roller. In one example the tape feed roller 154 may be driven by the C axis motor 162 that drives the contact roller 202. In this example the tape feed roller 154 may be removably connected to the contact roller 202 by a drive mechanism such as a belt or chain drive. The C axis motor 162 rotation of the contact roller 202 also rotates the tape feed roller 154 in order to push tape on to the edge as the contact roller 202 is driven. The tape feed roller 154 being commonly driven by the pressure roller 202 is advantageous because it synchronizes tape being feed as the pressure roller 202 starts being driven. The tape feed roller 154 is configured to feed the edge tape or edge band past the glue nozzles and onto the edge. As soon as the edge tape or edge band contacts the edge and is under the pressure roller, the tape feed roller 154 is disengaged. The glue head 150 may include appropriate sensors, for example a photoeye or photoelectric sensor, to detect the contact between tape and the edge. The glue head 150 also includes an appropriate mechanism to disengage the tape feed roller 154 from the pressure roller 202. Alternatively the tape feed roller 154 may be driven by its own associated motor that is controlled by an associated PLC or variable speed drive.

The tape feed roller 154 may also comprise a clamping roller configured to grip the tape when as the tape is being fed. The clamping roller gripping the tape helps to pull the tape off the spool 126 and feeds the tape adjacent the glue nozzles. The clamping roller may also be coupled by a chain or belt to either the tape feed roller 154 such that it is co-driven. The clamping roller may also be removably coupled to the tape feed roller 154.

The glue head 150 comprises an actuator 156 that is configured to move the glue head 150 relative to the chassis. The glue head 150 may be pivotably or moveably coupled to the chassis 120 such that at least a portion of the glue head can be moved relative to the chassis by actuator 156. The glue head 150 sometimes needs to be moved relative to the chassis 120 to prevent the glue head or components of the glue head from contacting or bumping the object 1. The actuator 156 may be a pneumatic actuator or a hydraulic actuator or any other suitable actuator. The glue head 150 may include one or more sensors that track the position of the glue head extremities and activate the actuator 156 to move the glue head away from an edge 10 so that the glue head 150 and its components do not bump the object or disengage the object from the supports 108. FIG. 4 shows the glue head comprises an anti-contact bar 158. The anti-contact bar 158 depends from the glue head 150. In one example the anti-contact bar 158 is coupled to and depends from the glue cartridge 152. The anti-contact bar 158 senses the presence of an edge. The anti-contact bar 158 may include a shoe or a rib or another moveable or deformable component that is configured to move or deform when the anti-contact bar 158 contacts the edge. The actuator 156 is activated when the anti-contact bar 158 contacts the edge 10 of the object 1. The actuator 156 activation causes the glue head 150 to move away from the anti-contact bar 158 and away from the edge 10 so that the glue head 150 does not hit the edge 10.

The edge modification apparatus 100 further comprises a plurality of cable conduits to house a variety of cables such as power cables to the various motors in the edge modification apparatus 100. The cable conduits house and protect cables and assist in cable management such that the cables remain clear of the moving parts of the apparatus 100.

Referring at least to FIGS. 1 to 4, the edge modification apparatus 100 further comprise a roller assembly 200 and a cutter assembly 300. The roller assembly 200 and the cutter assembly 300 comprise a plurality of components. The roller assembly 200 and the cutter assembly 300 are mounted on the chassis 120. The roller assembly 200 comprises at least a contact roller 202. In the illustrated embodiment of FIGS. 1 to 4 the roller assembly comprises a contact roller 202 and a trailing roller 204. In the illustrated embodiment shown in FIGS. 1-4 the contact roller 202 is a pressure roller 202. The pressure roller 202 is configured to apply a pressure to the edge 10 of the object 1 in order to adhere the edge tape or edge band to the edge 10 of the object 1. The pressure roller 202 is preferably directly coupled to the central shaft 160 (i.e. the C axis shaft). The C axis is the vertical axis that runs through the centre of the central shaft 160. The pressure roller 202 is driven by the C axis motor 162. The pressure roller 202 is preferably a circular roller and is configured to apply a force i.e. a pressure against the edge 10 of the object 1 to adhere the tape 11 to the edge. The pressure roller 202 is configured to apply a vectored force. The vectored force is defined by a direction and magnitude. More specifically the pressure roller 202 is configured to apply a force of a predetermined magnitude or a desired magnitude along a desired force direction.

The pressure roller 202 applies the force to the edge of the object. The force applied by the pressure roller relates to the force that is exerted by the first and second motors 130, 132. The variable speed drives can function to apply a controlled torque hence causing the first and second motors 130, 132 to apply a controlled force to the pressure roller 202. The pressure roller 202 in turn is arranged to apply the controlled force to the edge of the object.

The trailing roller 204 trails the pressure roller 202. Preferably the trailing roller 204 is rigidly connected to the chassis 120 by a suitable connector such as a connecting arm. The trailing roller 204 is preferably pivotable relative to the pressure roller 202. More specifically since the chassis 120 can pivot about the C axis, the trailing roller 204 also is capable of pivoting about the C axis due to chassis 120 pivoting. Alternatively the trailing roller 204 may be pivotably connected to the pressure roller 202.

The trailing roller 204 is preferably positioned between the pressure roller 202 and the cutter assembly 300. The trailing roller 204 functions as a spacer to space the cutter assembly 300 away from the pressure roller 202. The trailing roller 204 preferably prevents the cutter assembly 300 from colliding with or interfering with the pressure roller 202, by spacing the cutter assembly 300 away from the pressure roller 202.

The trailing roller 204 is rotatable and can rotate in use as it moves along the edge 10. The trailing roller 204 is configured to pull the cutter assembly 300 behind it, along the edge of the object 1. The trailing roller 204 preferably remains in contact with, moves along the edge and pulls the cutter assembly 300 along the edge behind the trailing roller 204.

The trailing roller 204 is preferably co-driven with the pressure roller 202, by the C axis motor 162. The C axis motor 162 drives both the pressure roller 202 and the trailing roller 204, preferably at the same speed. The trailing roller 204 is coupled to the pressure roller by linkage 206. The linkage 206 may be a chain drive or belt drive that couples the pressure roller 202 and trailing roller 204. The linkage 206 transmits drive forces to the trailing roller 204 as the pressure roller 202 is driven by the C axis motor 162. The linkage 206 may also comprise an arm linking the pressure roller 202 and the trailing roller 204. The length of the linkage 206 is preferably short enough to reduce drag of the trailing roller 204 and hence the cutter assembly 300. In an alternative embodiment the linkage 206 may comprise a pivoting arm that is configured to pivotably couple the trailing roller 204 to the pressure roller 202.

The trailing roller 204 is preferably rigidly connected to the chassis 120 such that the trailing roller 204 is moved relative to the object 1 as the chassis 120 moves. As discussed earlier the chassis 120 can rotate or move about the central shaft 160 i.e. about the C axis. The movement of the chassis 120 urges the trailing roller 204 in contact with the edge 10. The trailing roller 204 applies a contact force to the edge of the object 1.

The chassis drive motor 164 is configured to apply a torque to the chassis 120 and hence apply a torque to the trailing roller 204 to urge the trailing roller 204 against the edge 10. The trailing roller 204 applies a contact force to the edge of the object. The contact force applied to the edge is based on the torque applied by the chassis drive motor 164. The torque on the trailing roller 204 is preferably a predetermined torque to maintain contact between the trailing roller 204 and the edge. The contact force applied by the trailing roller 204 can be adjusted manually or automatically, preferably automatically. For example the contact force applied by the trailing roller 204 may be reduced on corners to reduce drag from the trailing roller 204 on the pressure roller 202. This is achieved by automatically controlling the torque applied by the chassis drive device i.e. the chassis drive motor 164.

The speed of rotation (i.e. the speed) of the pressure roller 202 and the trailing roller 204 may be set to a desired or predetermined speed and can be controlled depending on the shape of the edge 10. The roller drive device, in this example, the C axis motor 162 is controlled to drive the pressure roller 202 at a predetermined speed to allow enough contact time between the pressure roller and a section of edge tape or edge band to adhere the edge tape or edge band onto the edge 10 of the panel 1.

The speed of the pressure roller 202 can be varied based on the geometry of the edge. For example the speed of the pressure roller 202 and the trailing roller 204 may be reduced on non-linear sections of the edge as compared to linear sections of the edge. In an example the speed of at least the pressure roller 202 is reduced at tight corners or sharp corners to reduce chance of the rollers 202, 204 from slipping off the edge 10. Reducing speed around sharp corners also helps to enhance the glue bond to overcome any memory or resilient forces in the band, and ensure the band is correctly adhered to the edge of the panel. In a further example the speed of the pressure roller 202 may be slowed when approaching an inside corner 12 or an outside corner 14. The pressure roller 202 is driven at a constant speed along straight sections 16. Alternatively the speed of the pressure roller 202 may be variable on at least the linear or straight sections of edge. The speed of the pressure roller 202 is a predetermined speed. The predetermined speed may be dependent on a number of variables such as the material of the panel, the type of glue, the type/material of the edge tape, the dimensions of the panel etc. In an alternative embodiment the pressure roller 202 and the trailing roller 204 may be free spinning rollers.

The edge modification apparatus 100 comprises a controller 220. In one exemplary embodiment the edge modification apparatus 100 comprises a controller that is an electronic controller comprising at least a non transitory memory unit, a processor unit and a plurality of communication links or channels to communicate with other components of the edge modification apparatus such as the various motors or the variable speed drives. The communication links or channels may be wired or wireless connections. The processor may be any suitable electronic processor and the memory unit may be RAM, ROM, flash memory or any other suitable memory unit. The motors of the edge modification apparatus and other actuators etc. may be controlled by the central controller 220 or may be controller by their own associated controllers. The controllers associated with each of the motors and actuators can also be controlled by the central controller 220 via its communications links or channels. In one example the central controller 220 may be a PLC or other suitable controller. The controller may also be in electronic communication either wirelessly or by wired connection to a user interface 222 that can display information to a user and allow a user to input information.

The memory unit of the controller 220 is configured to store information such as predetermined pressure roller drive speeds or may also receive and store information from one or more sensors positioned on the edge modification apparatus 100. The controller 220 may be configured to control the C axis motor 162, the chassis drive motor 164, the first and second motors 130, 132 or the variable speed drives associated with the first and second motors 130, 132 through wired or wireless connections. Preferably the controller 220 is in electronic communication with the drives e.g. variable speed drives of the motors 130, 132, 160 and 164 to control operation of the motors. Alternatively the controller 220 may be configured to directly control motors 130, 132, 162 and 164.

The pressure roller 202 is urged against the edge 10 to provide a pressure on the edge to adhere the edge tape or edge band to the edge 10. The contact roller 202, specifically the pressure roller may be used in other edge modification processes. In order to get good adhesion, we want to apply a force of appropriate magnitude at a normal angle i.e. perpendicular to the tangent at the point of contact between the pressure roller 202 and the edge of the object 1. The force from the pressure roller 202 helps to create adhesion between the edge tape and the edge. Applying a force or an appropriate magnitude at a normal angle helps to urge the edge tape against the edge of the object.

Figure 5:
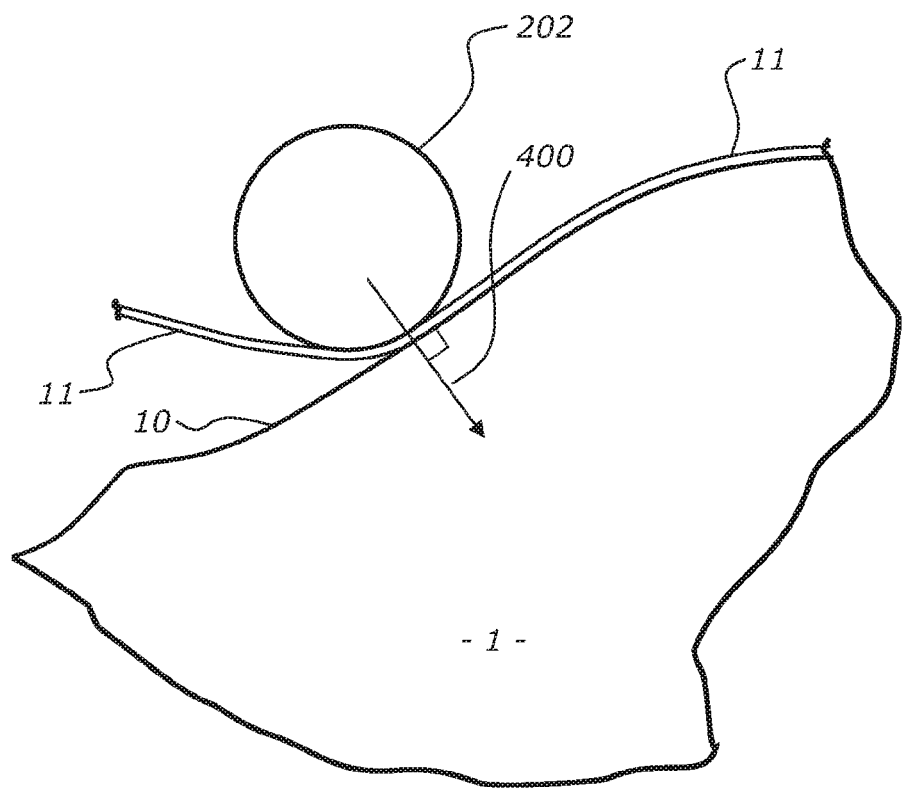
FIG. 5 shows a simplified example of an edge tape or edge band being applied to the edge of an object, using a pressure roller.

As discussed earlier the pressure roller 202 applies a force defined by a force vector 400. The force vector 400 is defined by a force direction and a force magnitude applied to the edge 10 by the pressure roller 202. FIG. 5 shows a simplified schematic of an edge tape 11 or edge band 11 being applied to the edge of an object, using a pressure roller 202. As shown in FIG. 5, the pressure roller 202 applies a force defined by the force vector 400. The force direction 402 is substantially normal relative to the edge 10 of the object 1. A substantially normal force direction is preferable because it provides optimal force to adhere the edge band or edge tape to the edge of the object.

The force application arrangement i.e. the first and second motors 130, 132 are configured and controlled to move the pressure roller 202 against edge 10 of the object 1. The first and second motors 130, 132 are controlled to move the chassis 120 such that the pressure roller 202 applies an initial force in a force direction 402. The first and second motors 130, 132 are preferably single axis motors that control the motion of the chassis 120 in a single direction. The variable speed drives associated with the first and second motors 130, 132 are controlled by the central controller 220 to activate the motors 130, 132. The first motor 130 and the second motor 132 may include drive belts or drive chains that connect to the carriage and frame, respectively, to move the carriage and frame.

The position of the pressure roller 202 may be determined on a coordinate system. In the illustrated example a Cartesian system is used. The apparatus 100 defines a global Cartesian coordinate system such that each position of the object 1 is defined on a global coordinate system. Each position of the pressure roller 202 is defined by an X and Y coordinate in the global Cartesian plane.

Alternatively the position of the pressure roller 202 may be determined as a radius and an angle (r, θ) on a polar coordinate system. The specification herein will described one implementation using a Cartesian system but similar results can be achieved using a Polar coordinate system or Spherical coordinate system or any other suitable coordinate system using appropriate mathematics.

Figure 6A:
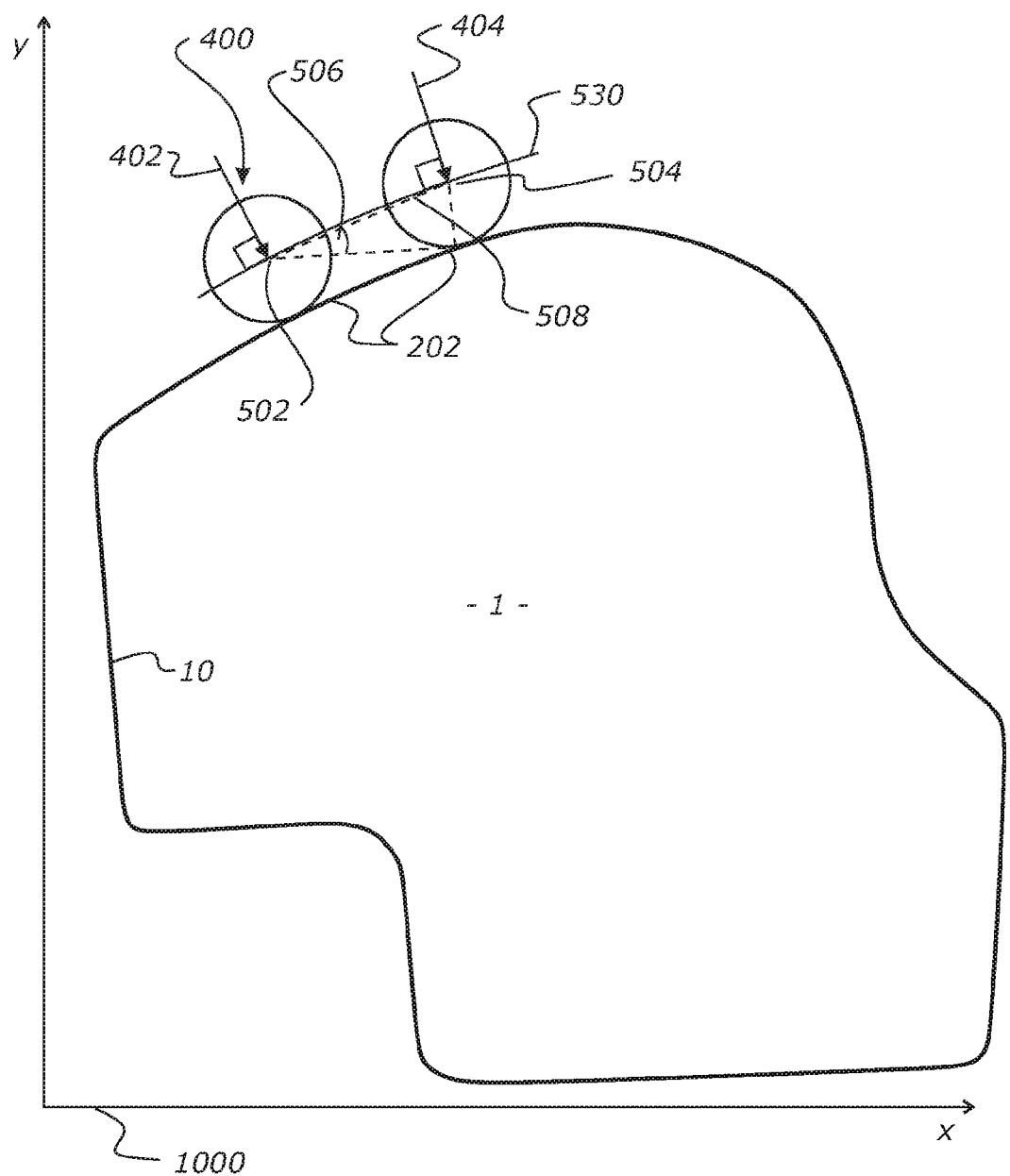
FIG. 6A shows a representation of the roller moving from a first position to a second position.

The edge modification apparatus 100 comprises one or more position sensors configured to measure a position of a contact roller 202 and/or a position of the chassis 120 in a coordinate system. The first motor 130 and second motor 132 may also include one or more encoders on the back of each motor that are used to control position of the contact and/or the chassis 120 in a global coordinate system. In the illustrated examples the global coordinate system is a Cartesian coordinate system, as shown in FIG. 6A. The position of the chassis 120 or contact roller 202 (i.e. pressure roller 202 in the presently described embodiment) can be controlled in a Cartesian system via the first and second motors 130, 132.

The encoders provide X and Y positions of the pressure roller 202 with a sub millimetre resolution. In one example the encoders used may have a resolution of 10ths of a millimetre. In a preferred example the edge modification apparatus 100 comprises 5000 pulse encoders that are in communication with the controller 220. The position sensors (e.g. encoders) are configured to sense the position of the roller 202 as the roller moves along the edge 10. In exemplary embodiment the encoders are configured to sense the position of the centre of the pressure roller 202. The controller 220 is configured to process the received signals from the encoders and measure a position of the pressure roller 202 in the global coordinate system 1000.

In another exemplary form the encoders may be configured to measure the X and Y position of the drive shaft 160 along the C axis since the pressure roller 202 is directly connected to the drive shaft 160. The position of the drive shaft 160 i.e. C axis shaft corresponds to the X and Y position of the roller.

Alternatively the edge modification apparatus 100, in particular the controller 220, of the edge modification apparatus may be configured to determine the position of the X motor 130 (i.e. first motor 130) and the Y motor 132 (Y motor 132) and convert the motor positions to positions of the pressure roller in the global Cartesian plane 1000. The controller 220 comprises executable instructions that allow the controller 220 to convert the encoder readings into a pressure roller position. The controller 220 may comprise suitable instructions and/or mathematical functions that convert the position of the motors to the position of the pressure roller 202.

As a further alternative the position sensors may comprise other position sensors such as optical sensors or hall-effect transducers or piezoelectric sensors or other suitable sensors that are configured to measure the position of the pressure roller 202 in the global coordinate system 1000.

The position sensors are mounted at suitable locations to measure the position of the pressure roller 202 on the edge of object 1 to provide a position of the roller within the global coordinate system 1000.

In a further alternative form the edge modification apparatus 100 may comprise position sensors in addition to the encoders to provide verification of the position readings from the encoders and also provide redundancy to the sensing system. The additional position sensors may be additional encoders or other position sensors such as optical sensors or hall-effect transducers or piezoelectric sensors or any other suitable position sensors that can be used in conjunction with or as an alternative to the position encoders described earlier.

In a further alternative example a tracing shoe may be used to track the travel direction of at least the pressure roller by sliding over the top of the panel. The tracing shoe may extend from the chassis 120 or the C axis shaft or the pressure roller.

Figure 6B:
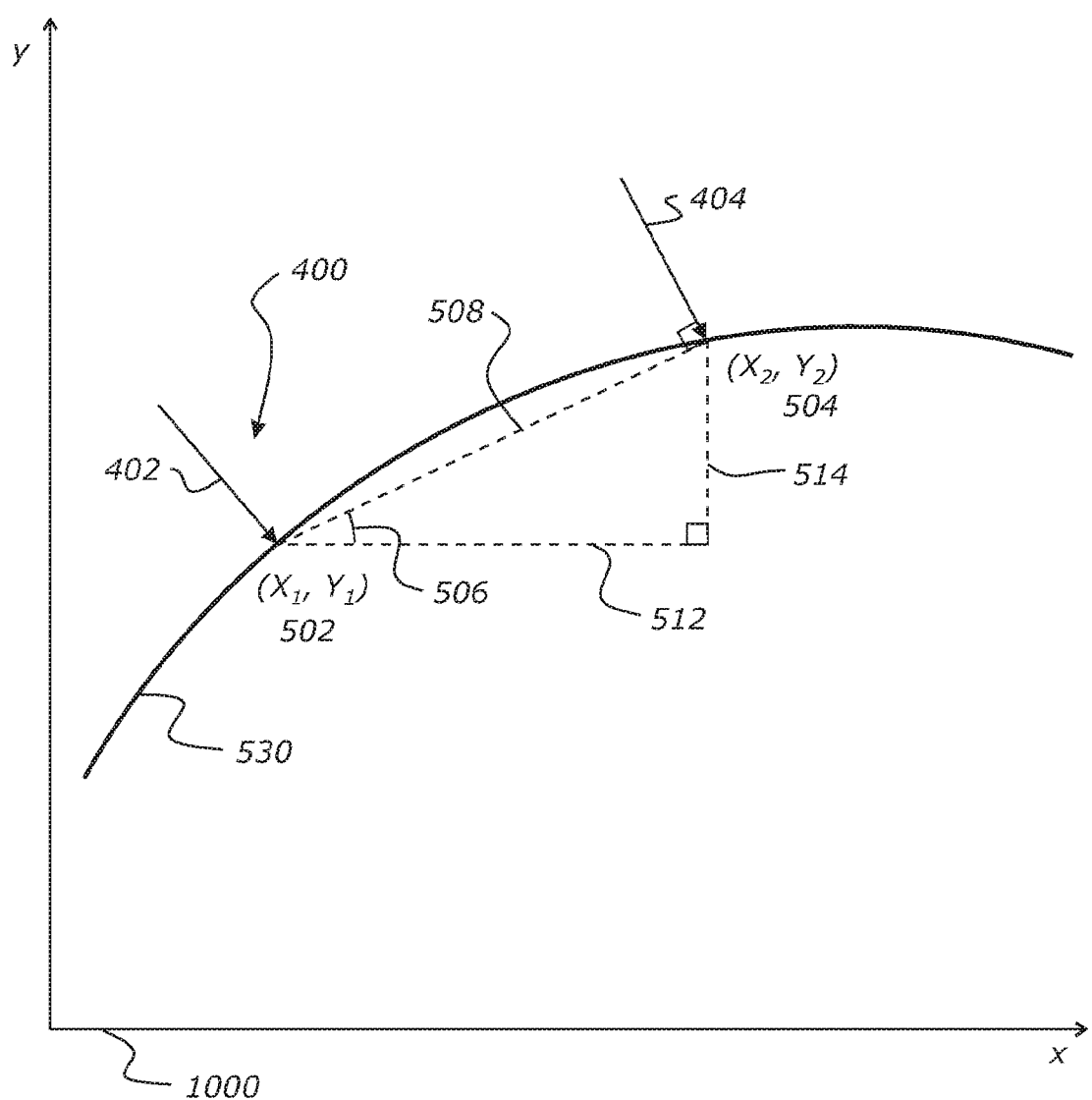
FIG. 6B a diagram illustrating a mathematical model used to determine a differential position of the pressure roller and an angle of travel as the pressure roller moves from a first position to a second position.

Referring to FIGS. 6A and 6B the edge modification apparatus 100 uses a global coordinate system 1000 to track the position of the pressure roller 202. FIG. 6A shows a representation of the pressure roller 202 moving from a first position to a second position in the global coordinate system 1000. The encoders that provide the X and Y position are based on a global coordinate system that is consistent across the entire panel. Since a global Cartesian system is used, each position on the panel has a corresponding X position and Y coordinate. Each position of the pressure roller 202 is also defined by a corresponding X and Y coordinate.

The controller 220 may configured to store or record the X and Y coordinates when the pressure roller 202 first makes contact with the edge 10 of the panel 1 (i.e. object 1). Alternatively the edge modification apparatus 100 may comprise a suitable sensor such as for example a photo electric sensor or photo-eye or a sensing shoe or a sensing bar that is configured to detect the pressure roller 202 contacting the edge 10 of the object 1. Alternatively a limit switch or an infrared sensor or other sensor can be used to detect contact between the pressure roller 202 and the edge 10 of the panel 1.

The initial position of the pressure roller 202 at the contact point with the edge 10 is preferably stored in the memory unit of the controller. Once the pressure roller 202 is in contact with the edge 10, the controller 220 is configured to switch the variable speed drives into a torque mode. In torque mode the variable speed drives control the force application arrangement, specifically the first and second motors 130, 132 (i.e. the X and Y motors) to provide a predetermined force onto the edge of the panel 10 via the pressure roller 202. The predetermined force may be a constant force. Alternatively the controller 220 may be configured to control the motors 130, 132 to provide variable force on the edge at different edge profiles.

Each motor comprises a gearbox that is geared to provide a specific force at 100% torque to the drive belts. The controller 220 controls the variable speed drives to apply a predetermined force i.e. a predetermined pressure along a force direction 402 of force vector 400. In one example at 100% the 1000 N of force can be delivered. The controller 220 is configured to control the variable speed drives to deliver up to 1000 N on the edge 10 of the panel, through the pressure roller 202. In one preferred example a constant force of 600 N is applied by the pressure roller 202 to the edge 10 of the panel. Other force levels can be applied and the controller 220 is configured to control the variable speed drives to vary the force delivered by the pressure roller 202. The level of force applied may be dependent on the type of edge tape used, the size of the panel, the size, the materials of the edge tape, the type of adhesive etc.

The controller 220 may be configured to store a plurality of different force settings in the controller memory that can be accessed and used by a user. In a further example controller 220 may also be configured to vary the force applied by the pressure roller 202 based on the location of the pressure roller 202 or based on a shaped or geometry of the edge 10.

The pressure applied by the pressure roller 202 is defined by a force vector 400. The force direction 402 as shown in FIGS. 6A and 6B is substantially normal to the edge 10 of the panel 1. The motors 130, 132 act on the chassis 120 and the pressure roller 202 to provide a force defined by the force vector 400 i.e. along a desired force direction 402 and at a desired magnitude. The force direction 402 is substantially normal to the edge 10 of the panel 1. The desired force direction changes along the profile of the edge 10 as the pressure roller 202 is driven along the edge 10, in order to act substantially normal to the edge. It is useful to deliver a force (i.e. pressure) from the pressure roller 202 that is substantially normal to the edge 10 of the panel 1 to ensure that the edge tape is correctly placed and adhered to the edge 10. The magnitude of the force is preferably constant as the pressure roller 202 moves along the edge to ensure enough pressure is applied to the edge tape or edge band to cause adhesion of the edge tape or edge band to the edge 10. If the pressure roller 202 acts substantially tangentially to the load, the edge tape or edge band may be misaligned or the pressure roller 202 may become disengaged from the edge 10 or cause the edge band/edge tape to slip or bunch.

The controller 220 is configured to determine a desired force direction 402 at small intervals, and control the position of at least the pressure roller 202 such that the pressure roller 202 exerts a force (i.e. a pressure) in accordance with a desired force direction (i.e. direction of the force vector). The magnitude of the force may be constant at all locations such as for example 600 N. The controller 220 is configured to control the force application arrangement (i.e. the first motor 130 and the second motor 132) to provide a constant force along the desired force direction. Alternatively the controller 220 may be configured to control the force application arrangement to vary the magnitude of the force applied to the edge 10 by the pressure roller, based on or more other parameters for example the type of edge tape or edge band, a geometry of the edge, the type of adhesive being used or any other suitable parameter.

A method of edge modification will now be described. Generally speaking the method of edge modification comprises placing a roller in contact with an edge of the object, measuring a first position of the roller, moving the contact roller along the edge from the first position to a second position, measuring the second position of the roller, calculating a desired force direction from the first position and the second position measurements, applying a force, by a pressure roller, along the desired force direction at the second position. The desired force direction is calculated from a vector angle between a first position and second position. The desired force direction is at an angle of 90 degrees to the vector angle. The method is implemented by the edge modification apparatus 100.

FIGS. 6A and 6B show a mathematical representations used to show the method of edge modification. FIG. 6A shows a representation of the roller moving from a first position to a second position. As shown in FIG. 6A the position sensors track the position of the centre of the roller 202. FIG. 6B shows a diagram illustrating a mathematical model used to determine a differential position of the pressure roller and an angle of travel as the pressure roller moves from a first position to a second position. FIG. 6B shows the centre of the roller and the force being applied. The path of the centre of the roller corresponds to the profile of the edge 10.

As shown in FIGS. 6A and 6B a force vector 402, 404 applied, at the first position and second position, through the centre of the roller 202 and through the contact point between the roller 202 and the edge 10. The forces illustrated in FIG. 6B are preferably applied through the centre of the roller and then transmitted to the edge via the contact point between the roller and the edge. The force applied by the roller at each point along the edge is substantially perpendicular to the tangent at the point of contact between the roller and the edge 10 to achieve good adhesion between the edge and the edge tape or edge band. The models shown in FIGS. 6A and 6B are used to illustrate the functioning of the edge modification apparatus, and in particular the functioning of the roller.

Referring to FIG. 6A the roller 202 moves from a first position 502 to a second position 504. The first position 502 and second position 504 are represented by an X and Y coordinate. The centre of the roller is tracked by position encoders that provide a position information regarding the roller 202. A plurality of position measurements are conducted as the roller moves along the edge 10.

A position vector 508 represents a differential position between a first position 502 and second position 504. The direction of the position vector 508 is defined by a vector angle 506. A vector angle 506 and a desired force direction 404 is calculated by the controller as described below with reference to FIGS. 6A and 6B. As seen in FIG. 6B the first position 502 and the second position 504 are defined as Cartesian coordinates i.e. an X and Y coordinate. The first position 502 is defined by X1, Y1 and the second position 504 is defined by X2, Y2. The global coordinate system 1000 is a Cartesian system mapped onto the entire object and defines the X and Y axes. The coordinate system is constant and unchanging throughout the process of tracking the position of the roller 202.

The position vector 508 is a straight line approximation between a first position 502 and a second position 504. A vector angle 506 is calculated by the controller from the differential position. The vector angle 506 defines a direction and is the angle between the position vector 508 a reference axis of the coordinate system 1000.

In the illustrated example the reference axis for angle measurement is the X axis. Therefore the vector angle 506 between the first position 502 and the second position 504 is the angle between the position vector 508 and the X axis. The position vector 508 is used to approximate a non-linear edge profile with a straight line. It has been found that the approximation is sufficiently accurate if the sampling distance between two measured points on the edge is suitably small. The distance between the first position and second position is defined by the sampling distance. Put another way, it has been found the approximation is sufficiently accurate if the sampling time is suitably short.

The position of the pressure roller 202 is measured at regular intervals. The regular interval is less than or equal to approximately 5 mm. Preferably the regular interval (i.e. sampling distance) is between 2 mm and 5 mm. More preferably the regular interval is approximately 3 mm. A regular measuring interval of approximately 3 mm has been found to reduce the chances of false measurements due to surface imperfections in the edge 10, such as bumps, irregularities, surplus glue etc. Measuring the roller position every 3 mm or at least every 2 mm to 5 mm provides for filtering of noise i.e. incorrect data.

Preferably the vector angle and/or the differential position are calculated by the controller 220 every time a new position is measured by the position sensors (i.e. encoders). The controller 220 is also configured to determine a desired force direction for every measured position based on at least a currently measured position and a previously measured position. The force application arrangement a predetermined force is applied by the pressure roller 202 along each force direction that is calculated by the controller 220 for that position.

In one example the sampling rate and/or processing time to process sampled signals and determine a desired force direction is performed fast enough to approximate real time. The controller is configured to determine a desired force direction at each position and control the force application arrangement to apply a force along the determined desired force direction in approximately real time. The differential position 508 defines a direction from the first position 502 to the second position 504.

With reference to FIG. 6B the change in the X component i.e. the differential X component 512 is the difference between the X coordinate of the second position and the X coordinate of the first position. In the illustrated example of FIG. 6B, the X component 512 would be defined by X2 minus X1 (i.e. X2−X1). The change in the Y component i.e. the differential Y component 514 is defined as the difference between the Y coordinate of the second position and the Y coordinate of the first position. In the illustrated example of FIG. 6B, the differential Y component 514 is calculated as y2 minus y1 (i.e. Y2−Y1). The differential position is represented by the differential X component and differential Y component i.e. (X2−X1, Y2−Y1).

The vector angle 506 defines an angular change in the path of the pressure roller 202, between two points of travel. In the illustrated example of FIG. 6B the vector angle 506 is relative to the X axis. The vector angle 506 is determined by applying a trigonometric function on to the differential position between the second and first positions. The controller 220 is configured to determine the vector angle 506 by applying an inverse tangent function to the differential position. More specifically the vector angle is calculated by applying an inverse tangent function to the Y component 514 divided by the differential X component 512. Alternative trigonometric functions or other geometric mathematical functions may be used to determine the vector angle 506.

The controller 220 calculates a desired force direction 404 that is substantially normal to the position vector 508 at the second position 504. The desired force direction 404 is also approximately normal to the edge at the second position 504. The desired force direction 404 is calculated from the first and second position measurements. The desired force direction 404 is calculated from a vector angle between the first position 502 and second position 504. The desired force direction is calculated by adding or subtracting a transform value from the vector angle 506. The transform value is such that the desired force direction is substantially normal to the vector angle 506. The desired force direction 404 is preferably at an angle 90 degrees from the vector angle 506. In one example the desired force direction is calculated by adding 90 degrees to the vector angle. Alternatively the desired force direction 404 is calculated by subtracting 270 degrees from the vector angle 506. Alternatively any other transform value can be used to determine the desired force direction 404 from the vector angle 506 based on the coordinate system used.

The pressure roller 202 is adjusted such that the force applied by the pressure roller 202 acts along the desired force direction 404. The force application arrangement (i.e. first and second motors 130, 132) is controlled such that the pressure roller 202 applies a predetermined force along the desired force direction angle at the second position 504 (i.e. a current position). Preferably the first motor 130 (i.e. X motor) and second motor 132 (i.e. Y motor) are controlled to move the pressure roller 202, relative to the object 1, to apply a predetermined force along the desired force direction 404.

The controller 220 may comprise a non transitory computer readable medium e.g. a memory unit that stores computer readable and executable instructions and a processor to execute the instructions. The electronic processor of the controller 220 is configured to determine the vector angle 506 using programmed computer readable instructions that define the method described above. The memory unit is also configured to store appropriate mathematical formulae as computer readable and executable instructions The second force direction 404 is different in orientation to the first force direction 402, on curved or non-linear edges. On a straight edge the second force direction 404 will be the same as the first force direction 402. The second force direction 404 is substantially normal to the edge at the second position 504, while the first force direction 402 is substantially normal to the edge at the first position 502.

The process described above is repeated every time new position data of the roller 202 is sampled. In one example a desired force direction is calculated every time a new position is measured. Preferably a desired force direction is calculated every 2 mm to 5 mm of roller displacement. Even more preferably the desired force direction is calculated approximately every 3 mm. The force direction calculation is preferably performed at the same frequency as the sampling frequency i.e. every time a new position of the roller is sampled, a new desired force direction is calculated by the controller 220. The controller 220 controls the force application arrangement (i.e. motors 130, 132) to cause the pressure roller 202 to apply a predetermined force along the desired force direction.

This process of determining a new force vector direction substantially normal to the edge is advantageous because the pressure roller 202 can act as a sensor and a pressure roller. This system is advantageous because it determines the correct normal force vector on the fly without requiring complex sensing mechanisms or without requiring prior knowledge of the edge profile. Several prior art systems use a known map or known edge profile that is stored in a memory unit. These systems are expensive to use, limited to the stored edge profiles and also can be cumbersome to use due to the constant programming required when a new panel or new object having a different edge profile is required to be processed.

The present apparatus, as described herein, of determining the force vector based on the differential position is also advantageous because it results in a more accurate determination of a normal force vector.

Prior art systems that use sensors still provide an inaccurate normal direction due to assumptions that are made when determining a relationship between a sensor and the actual pressure roller. Further a number of prior art systems also need a work piece to be positioned in a known position or known orientation. The present edge modification apparatus as described herein is advantageous because a work piece (i.e. an object 1), such as a panel, can be positioned in any orientation on the supports 108 or a bed. The present apparatus is configured to determine a desired force direction that is substantially normal to the edge of the work piece, regardless of the orientation or position of the work piece. This is advantageous because a user can place the work piece in any orientation and does not to check if the work piece is in a precise orientation. Further the user does not need to pre-program the orientation of the work piece to be in a specified orientation. The present apparatus is also advantageous because it provides a more robust approach to determining an ideal force direction.

It will be appreciated that the beginning of the process when the pressure roller 202 is brought into contact with the edge no force determination is made. At p0 (meaning position 0, the first ever position the pressure roller is brought into contact with the edge), no normal force direction is calculated by the controller. Preferably the roller is brought into contact at a normal direction with the edge i.e. a user controls the apparatus such that the roller approaches and contacts the edge at an initial position in a direction that is substantially normal to the edge.

Alternatively the roller 202 may be brought generally in contact with the edge at an initial position in such that the force from the roller acts in any initial direction. The method begins calculating the normal force from the next measured position and follow the process described with reference to FIGS. 6A and 6B. The apparatus is configured to implement the process as described with reference to FIGS. 6A and 6B, such that a force from the roller 202 is applied along a desired force direction that is substantially perpendicular to the point of contact between the roller and the edge.

FIGS. 3, 4, 7 and 8 show a cutter assembly 300 depending from the trailing roller 204. The cutter assembly 300 is pivotable relative to the trailing roller 204 such that the cutter assembly 300 can be pivoted toward the edge or away from the edge 10. The cutter assembly is pivotable about a vertical axis that is parallel to the C axis. The cutter assembly comprises a cutter 302, a cutter drive unit 304 and a cutter support arm 306. The cutter support arm 306 is pivotably coupled to the trailing roller 204 such that it allows pivoting of the cutter 302.

The cutter 302 may include one or more blades that cut the edge tape or edge band. The cutter 302 may include a pair of cutters 310, 312 disposed on a pair of moveable pads. The cutters 310, 312 are vertically movable relative to a fixed panel 1 along a spindle or axis, as shown in FIG. 1. The cutter drive unit 304 is preferably a motor that is in mechanical communication with the cutter to operate the cutters 310, 312. The cutter drive unit 304 is configured to control the movement of the cutters 310, 312 towards or away from the edge 10 of the panel 1. Further cutter drive unit 304 is configured to control the speed of each cutters 310, 312. The cutter drive unit 304 comprises appropriate coupling mechanisms and drive mechanisms such as drive shafts, belts or chain drives that are configured to operate each cutter 310, 312. The cutter assembly 300 may also comprise one or more positioning shoes 314, 316 that depend from each cutter 310, 312 and allow the cutter to sense the edge such that the cutter 302 and the controller 220 can detect when the cutter is in contact with the edge 10. In one exemplary embodiment the positioning shoes 314, 316 are used to sense the top and bottom of the edge such that the cutters 310, 312 can be brought into an operational position for cutting excess edge tape or edge band.

The cutter assembly 300 comprises a cutter actuator 308. The cutter assembly 300 may pivot relative to the trailing roller 204 due to a moment provided by the cutter actuator 308. The cutter actuator 308 comprises suitable mechanisms such as for example a motor or a piston that is configured to exert a torque or moment on the cutter support arm 306 to pivot the cutter 302 toward or away from the edge 10 of the panel 1, about a vertical axis parallel to the C axis. Alternatively a torque may be exerted by the trailing roller 204 on the cutter support arm 306 to pivot the cutter support arm 306 toward or away from the edge 10 of the object.

Preferably the cutter assembly 300 is directly coupled to the trailing roller 204 with a short support arm 306 to reduce any dragging of the cutter assembly 300. The cutter actuator 308 may be configured to exert a constant torque to move the cutter 302 against the edge 10 of the panel 1. The cutter actuator 308 is configured to provide a moment such that the cutter 302 is always held against the edge 10 such that the cutters 310, 312 can act on the edge. The cutters 310, 312 are configured to trim excess edge tape protruding vertically from the edge 10 such that the tape against the edge 10 is flush. The speed of the cutter 310, 312 may be a constant speed or may be varied depending on one or more factors such as for example edge geometry or type of edge tape/edge band, the thickness of the panel etc. The cutters 310, 312 are preferably driven by a cutter motor 318.

The currently described edge modification method and apparatus 100 is advantageous because the direction of the force delivered by the pressure roller 202 is more accurate i.e. the force direction is substantially normal to the edge or close to the normal of the edge 10 of the panel 1. The currently described edge modification method and apparatus is also advantageous because the force direction calculation is done on the fly without "sensing" the profile of the edge in advance. Further the controller 220 is configured to provide more accurate control of the motors 130, 132 via the variable speed drives thereby making the force applied more consistent.

The pressure roller 202 used can be a urethane material with less grip as compared to rubber rollers or other prior art rollers thereby reducing the edge tape bunching or slipping. Urethane rollers can be used because the force (i.e. pressure) applied is substantially normal i.e. the force applied by the pressure roller is almost normal or exactly normal to the edge 10 of the panel 1. Therefore less grip is needed on the rollers since the direction of the force delivery provides for more efficient gluing of the tape to the edge. Urethane rollers being used are cheaper and more durable hence longer lasting.

The controller 220 is configured to determine an orientation of the cutter assembly 300 in relation to the edge. The controller 220 is further configured to control the cutter actuator 308 to move the cutter assembly 300 to be located in a determined orientation relative to the edge 10. The orientation change of the cutter assembly 300 is controlled by the cutter actuator 308 and the position of the trailing roller 204. Preferably the cutter actuator 308 applies a constant torque on the support arm 306 to constantly move the cutter 302 toward the edge 10. The cutter actuator 308 creates a torque on the cutter support arm 306. The pressure roller 202 may create a torque on the trailing roller 204 as the pressure roller 202 is driven along the edge 10. The torque from the trailing roller 204, in addition to the torque from the cutter actuator, move the cutter assembly 300 towards or away from the edge of the object. Preferably there is a constant torque applied by the cutter driver 304 to urge the cutter against the edge 10.

The chassis drive motor 164 is configured to apply a torque on the trailing roller 204 to maintain contact between the trailing roller 204 and the edge 10. The chassis drive motor 164 is configured to apply a force to rotate the chassis about the C axis shaft 160 such that a torque is applied to the trailing roller 204 to urge the trailing roller 204 in contact with the edge 10. The torque applied to the trailing roller 204 may be constant. The torque applied to the trailing roller can be varied during corners for example during a tight corner the trailing roller 204 creates a force resisting the rolling motion of the pressure roller 202. This can make the band or edge tape slip.

The trailing roller 204 is used and is advantageous because it acts as a spacer for the cutter assembly 300. The trailing roller 204 spaces away the cutter assembly 300 from the pressure roller 202, and reduces the chances of the cutter assembly 300 hitting the pressure roller 202 on corners, such as inside corners. The trailing roller 204 also provides a linkage that prevents the cutter assembly 300 from hooking onto the edge on corners that are greater than 90 degrees i.e. outside corners. The trailing roller 204 helps to pull the cutter assembly 300 around the outside corner.

Figure 7:
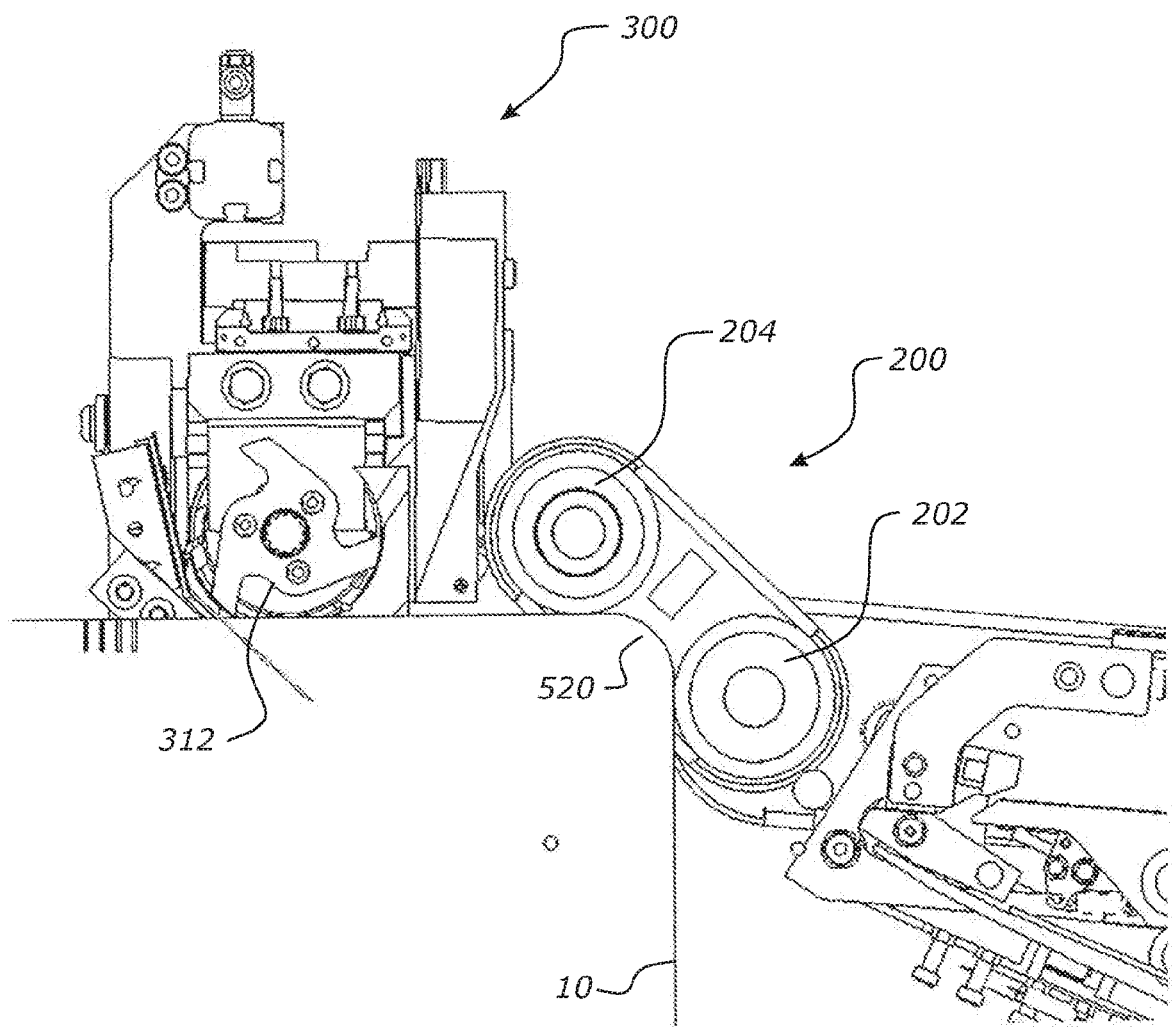
FIG. 7 shows an example of an outside curve and the edge modification apparatus acting on an outside curve.
Figure 8:
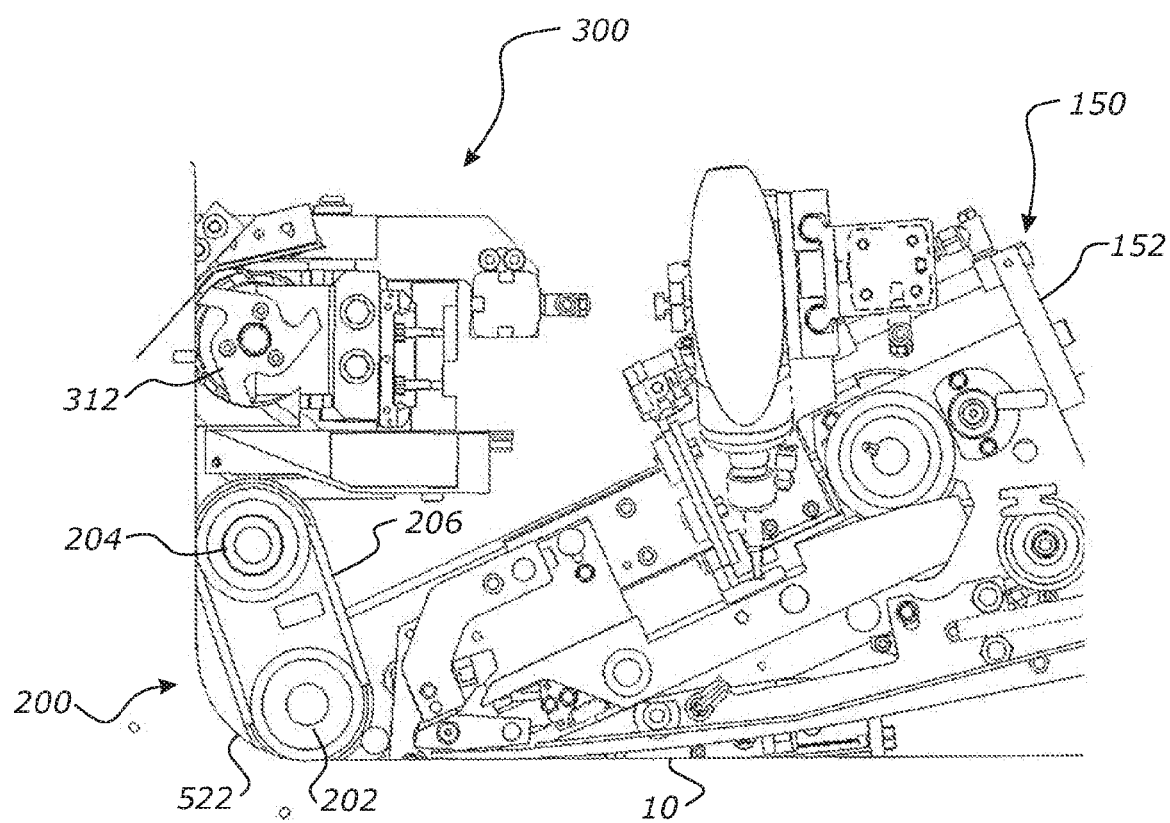
FIG. 8 shows an example of an inside curve and the edge modification apparatus acting on an inside curve.

FIG. 7 shows an example of an outside curve 520 and the edge modification apparatus 100 determining an outside curve. The outside curve will result in greater X component and Y component changes due to the increased distance of travel of the pressure roller 202. FIG. 8 shows an example of an inner inside curve 522. The inside curve 522 will result in a reduced X component and Y component change, thereby illustrating an inside curve.

As seen in FIGS. 7 and 8 the trailing roller 204 maintains close proximity to the pressure roller 202. The torque on the cutter support arm 306 is preferably constant but may be varied on non-linear sections of the edge. The torque on the cutter assembly may be varied based on the shape of the edge. Preferably the torque is constant on a straight edge.

The driving speed of the pressure roller 202 may be varied at corners or on non-linear sections of the edge to ensure the pressure roller 202 spends enough time in contact with the edge tape or edge band to prevent slipping or air bubbles between the edge tape/edge band the edge 10 of the object 1. The adjustment of the pressure roller 202 achieved by the controller 220 controlling the speed of the C axis motor. The speed of the pressure roller 202 may be based on a detected non-linear section.

The geometry of a corner is detected by the controller based on a change in the vector angle or desired force direction. Preferably a non-linear portion of the edge (e.g. a corner) is detected based on the rate of change of the vector angle numeral as the roller 202 moves along the non-linear section. For example the rate of change of the vector angle may relate to the radius of the corner. A fast rate of change of vector angle may relate to a sharp corner. A slow rate of change of vector angle may relate to a shallow corner. Zero rate of change of vector angle represents a linear section i.e. a straight section of edge.

Alternatively the controller 220 may be configured to determine the angle of the force direction (i.e. angle of the direction the force is applied), relative to the global coordinate system 1000. The controller 220 may be configured to track the angle of the force direction. If the angle of the force direction increases or decreases a corner is detected.

In a further alternate form the edge modification apparatus 100 may comprise a plurality of sensors that are configured to detect the presence of a corner. For example the edge modification apparatus may include a photoelectric sensor such as a photo eye or other optical sensors or infrared sensors to detect a corner is approaching.

The controller 220 is configured to adjust the speed of the roller 202 based on the detected linear and/or non-linear section of the edge. For example the speed of the roller 202 may be reduced when a non-linear section is detected, as compared to a linear section of edge. In another example the speed of the roller is less on a non-linear section when a non-linear section is an outside corner, as shown in FIG. 7 or an inside corner as shown in FIG. 8. The reduction in speed of the pressure roller 202 on non-linear parts of the edge, especially at corners is advantageous due to reduced chances of the edge band slipping or coming apart and to also improving adhering of the edge tape to the edge 10 of the panel 1. In some configuration the controller may be configured to store predetermined pressure roller 202 speeds based on the type of corner or non-linear detected. The type of corner or non-linear section may be detected based on a rate of change of the vector angle. In some configurations different drive speeds may be applied to the pressure roller 202 based on the detected shape of the edge. Tape and glue characteristics may also affect the drive speed of the roller.

The controller 220 is further configured to control a torque applied by the cutter actuator 308 to the cutter assembly 300 based on the shape of the edge. The controller 220 is configured to apply less torque when a non-linear edge is determined as compared to a linear section. The controller 220 controls the cutter actuator 308 to apply less torque on corner of the edge. The controller 220 controls the cutter actuator 308 to apply less torque on an outside corner 520 (as shown in FIG. 7) or an inside corner 522 (as shown in FIG. 8) as compared to a straight section. Reducing the torque on corner reduces the drag from the cutter assembly 300 on the pressure roller 202 and reduces the chances of the cutter assembly 300 getting stuck on a corner. Further the reduced torque also aids in maintaining the cutters in the correct operable position as the cutter trails the roller 202 on a non-linear section.

A contact force is applied by the trailing roller 204. The contact force is caused by the chassis drive device e.g. the chassis drive motor 164. The chassis drive motor 164 applies predetermined torque or force to adjust the trailing roller 204. The contact force exerted by the chassis drive motor 164 is preferably varied based on the shape of the edge. For example the contact force is less on a non liner section than on a linear section. The contact force applied by the chassis drive motor 164, to hold the trailing roller 204 in contact with the edge is less on an outside corner 520 or inside corner 522 as compared to a straight section. This reduction in contact force reduces drag effects on the pressure roller 202. In some configurations the contact force applied by the chassis drive motor 164 may be varied depending on the detected geometry of the corner or non-linear section. For example the force from the trailing roller 204 is less on an inside corner or outside corner than a straight or linear edge in order to reduce drag effects on the pressure roller 202.

In some situations the controller 220 may be configured to adjust the X and Y drives (i.e. motors 130, 132) such that the pressure roller 202 provides a force along a force vector direction that is at some arbitrary or predetermined angle (i.e. that is not normal to the edge). At inside or outside corners it may be necessary to deliver a force, by the pressure roller 202, at an angle other than substantially normal to the edge as the roller 202 travels around the corner to improve edge tape adherence to the edge. In these situations the described method is overridden.

In one optional configuration the controller 220 may configured to control the spool motor to adjust the feed rate of the edge tape or edge band depending on the geometry of the edge. For example the spool motor can be controlled to lower the feed rate on inside or internal corners, such as that shown in FIG. 8. In another example the spool motor may be adjusted to increase the tape feed rate on an external or outside corner, such as that shown in FIG. 7. The tape feed rate is controlled based on the determined position and determined angle of the pressure roller 202.

A more accurate determination of position of the pressure roller 202 and a more accurate determination of the force direction (i.e. angle of force applied to the edge) provides a more accurate control of the feed rate, thereby improving the adherence of the tape to the edge and reducing the tape from slipping, bunching and bubbling on the edge. The improved feed rate control, based on the improve position tracking of the pressure roller 202, results in a cleaner finish on the edge 10 of the panel 1.

Figure 9:
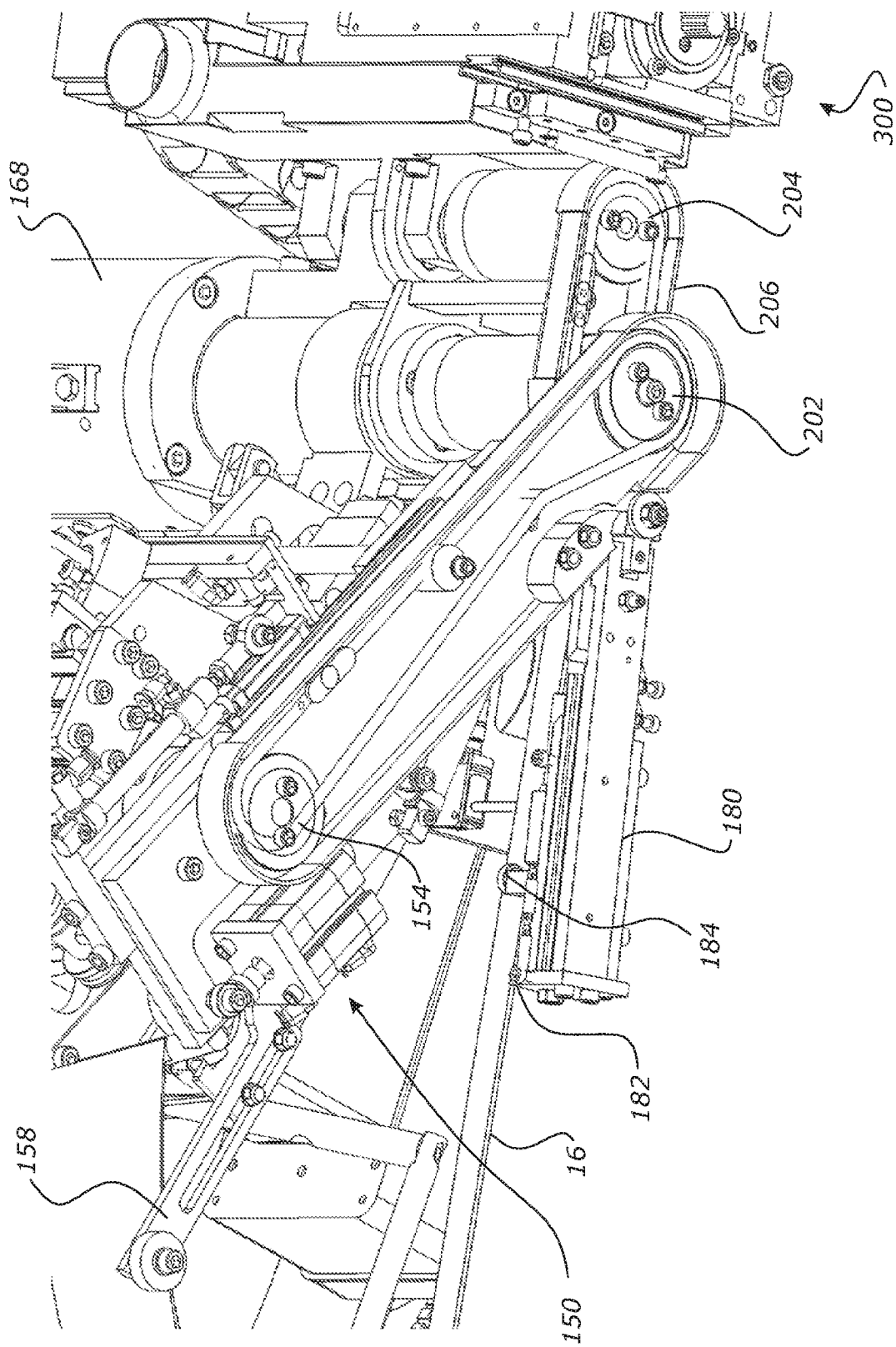
FIG. 9 shows a joint sensing arm, of the edge modification apparatus, deployed against a straight edge.
Figure 10:
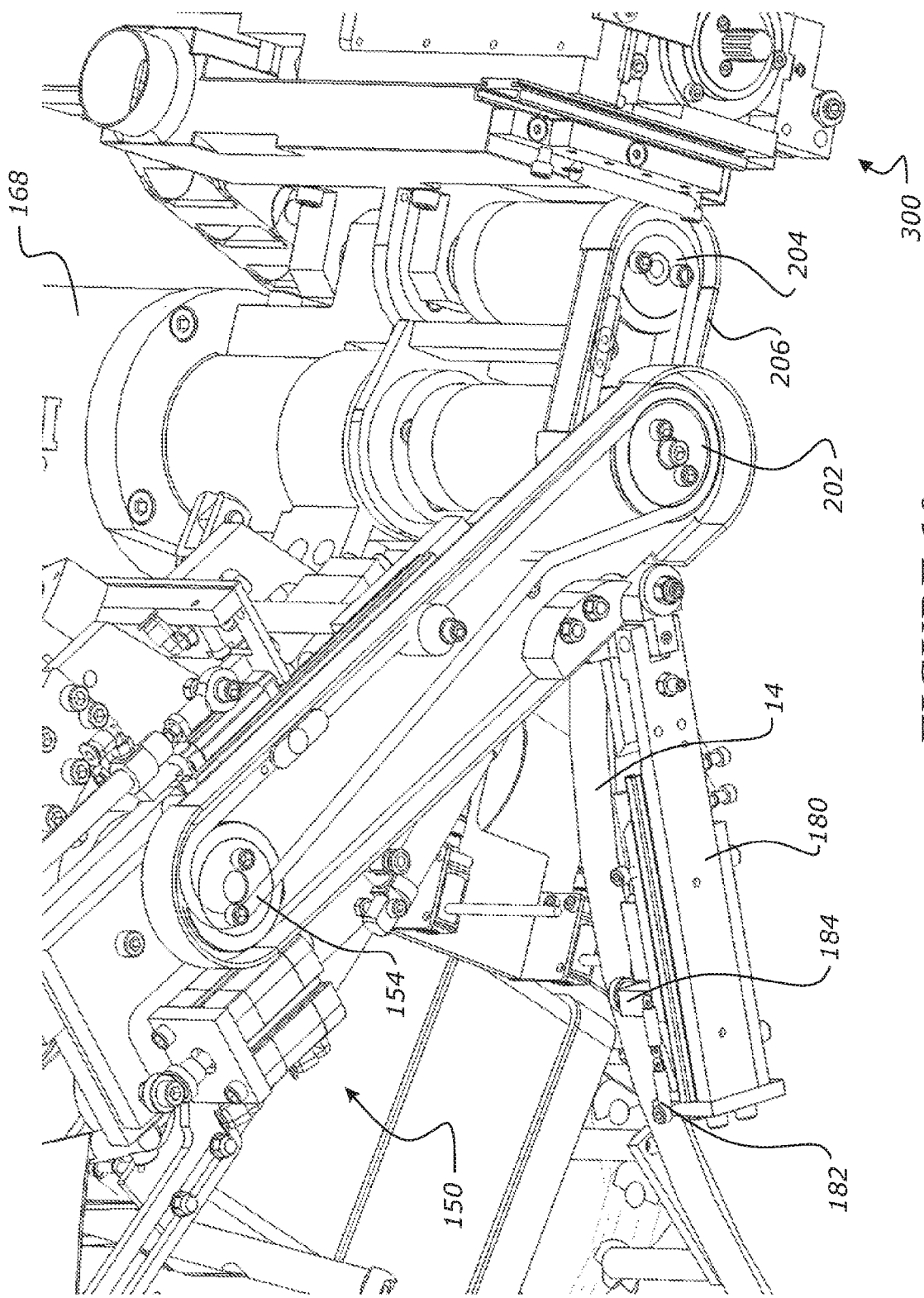
FIG. 10 shows a joint sensing arm, of the edge modification apparatus, deployed against a curved edge.

Referring to FIGS. 9 and 10 there is shown a joint sensing arm 180 that is used to accurately create a butt joint between a leading edge and trailing edge of the edge tape. As part of the edge modification process an edge tape or edge band is laid against the edge of an object (e.g. a panel) and adhered to the edge by pressure from the pressure roller 202. One challenge in edge modification i.e. edge banding is to create an accurate and flush butt joint between the leading and trailing edge of the edge tape or edge band. It is desirable that the start and end of the tape are flush with each other to provide a flush joint and smooth finish to the edge. It is undesirable to have a significant overlap between the leading and trailing edges of the edge tape or edge band, or have a gap between the leading and trailing edges. A large overlap or a gap creates an unsightly finish to the edge. The edge modification apparatus 100 allows for accurate cutting of the tape to create a flush butt joint between the leading and trailing edges of the tape.

The edge modification apparatus includes a joint sensing arm 180 that is used to sense the leading edge and trigger a tape cutter (not shown) to cut the tape to an desired length such that the trailing edge lands adjacent the leading edge to create a flush joint. The joint sensing arm 180 comprises a pivoting arm that is pivotably coupled to the chassis 120 or to the glue head 150. The joint sensing arm 180 comprises a vertical tracing shoe 182 and a horizontal tracing shoe 184. The horizontal tracing show sensing the edge of the band for the join. The joint sensing arm may also include a linear encoder on a slide bearing arrangement. FIG. 9 shows the joint sensing arm 180 engaged against a straight section of edge 16. FIG. 10 shows the joint sensing arm 180 in contact with a curved section 14 of the edge.

When a new roll of edge tape or edge is positioned on the spool 126 the leading edge is preferably pre-cut to include a chamfer on the edge tape or edge band. The controller 220 is configured to record the position of the first contact point of the pressure roller 202, as the pressure roller 202 is brought into contact with the edge 10. The X and Y coordinates, relative to coordinate system 1000 may be recorded in the memory of the controller 220. The pressure roller 202 is driven around the edge and the edge tape or edge band is continuously feed by spool 126. The controller 220 is configured to detect the position of the pressure roller 202 as it moves around the edge of the panel 1. The controller 220 is configured to deploy the joint sensing arm 180 by pivoting the joint sensing arm outwardly from the chassis.

The joint sensing arm 180 preferably comprises an actuator, e.g. a pneumatic actuator that is configured to deploy the joint sensing arm 180. The arm 180 has a predefined length e.g. 130 mm. The vertical sensing tracing shoe 182 and the horizontal tracing shoe 184 are configured to precisely follow the edge of the panel. The joint sensing arm 180 is configured to slide along the edge sending measurement data back to the controller 220. The measurement data may be position information obtained from the linear encoder attached to the arm. The joint sensing arm 180 is used to sense the location of the leading edge by sensing the chamfer. The controller 220 is configured to process the position information of the joint sensing arm 180 and is configured to operate a tape cutter that cuts the tape to a target distance such that the trailing edge of the tape lays adjacent to the leading edge of the tape. The target distance may be the distance of the joint sensing arm 180 on a straight edge or the target distance may be calculated based on the geometry of a corner, as determined by monitoring the position of the pressure roller 202.

The edge tape or edge band that is connected to the roll of tape/band on the spool remains in the channel 140 in preparation for the next panel and will include a chamfer on the leading edge. The method of creating butt joints using the edge modification apparatus 100 described herein is advantageous because it provides flush butt joints more repeatably and with minimal human intervention. Further the substantially automated process also makes processing of the panels quicker and reduces rejection rates or re-work rates because the position of the roller 202 is tracked and used to create an exact length of tape such that the leading and trailing edge abut each other.

Figure 11:
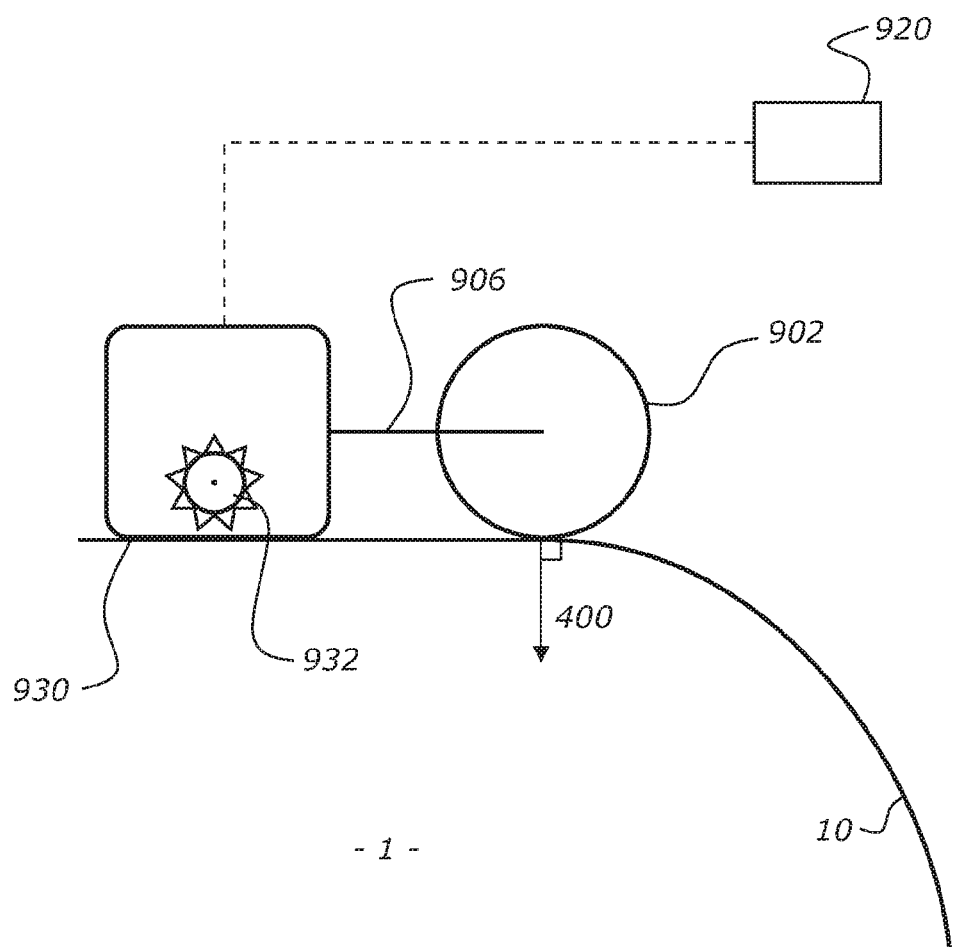
FIG. 11 shows an alternative embodiment of an edge modification apparatus that comprise a single pressure roller and cutter assembly directly and pivotably coupled to the pressure roller.

FIG. 11 shows a further alternative embodiment of edge modification apparatus 900. The edge modification apparatus 900 comprises the same components as edge modification apparatus 100 except the trailing roller. The apparatus 900 includes a chassis (not shown), a glue head (not shown) and a force application arrangement like apparatus 100. FIG. 11 shows a simplified version of the alternative embodiment and only illustrates the contact roller 902 and the cutter assembly 930. The alternative embodiment of the edge modification apparatus 900 also comprises a force application arrangement including a pair of X and Y drive motors similar to motors 130, 132. The contact roller 902 in this embodiment is a pressure roller 902 that exerts a force on the edge along a desired force direction to adhere edge tape or edge band to the edge of an object e.g. a panel.

The pressure roller 902 is also preferably mounted on a C axis shaft and driven by a C axis motor similar to C axis motor 160. The edge modification apparatus 900 further comprises a chassis and a chassis drive motor to rotate the chassis similar to edge modification apparatus 100. The edge modification apparatus further comprises a glue head, a joint sensing arm, a spool and other components similar to the edge modification apparatus 100.

The cutter assembly 930 is similar in construction to the cutter assembly 300 as described earlier and includes all the same components including a cutter drive that drives the cutting blades and can provide a torque. For example the cutter assembly includes a cutter 932 that is preferably operated by a cutter motor (not shown). The cutter assembly 900 may comprise a suitable C axis motor that exerts a torque to urge the cutter against the edge. In this alternative embodiment the cutter assembly 930 is coupled directly to the pressure roller 902 via a linkage 906. The cutter assembly 930 is pivotably connected to the pressure roller 902 and can pivot relative to the pressure roller 902.

Figure 13:
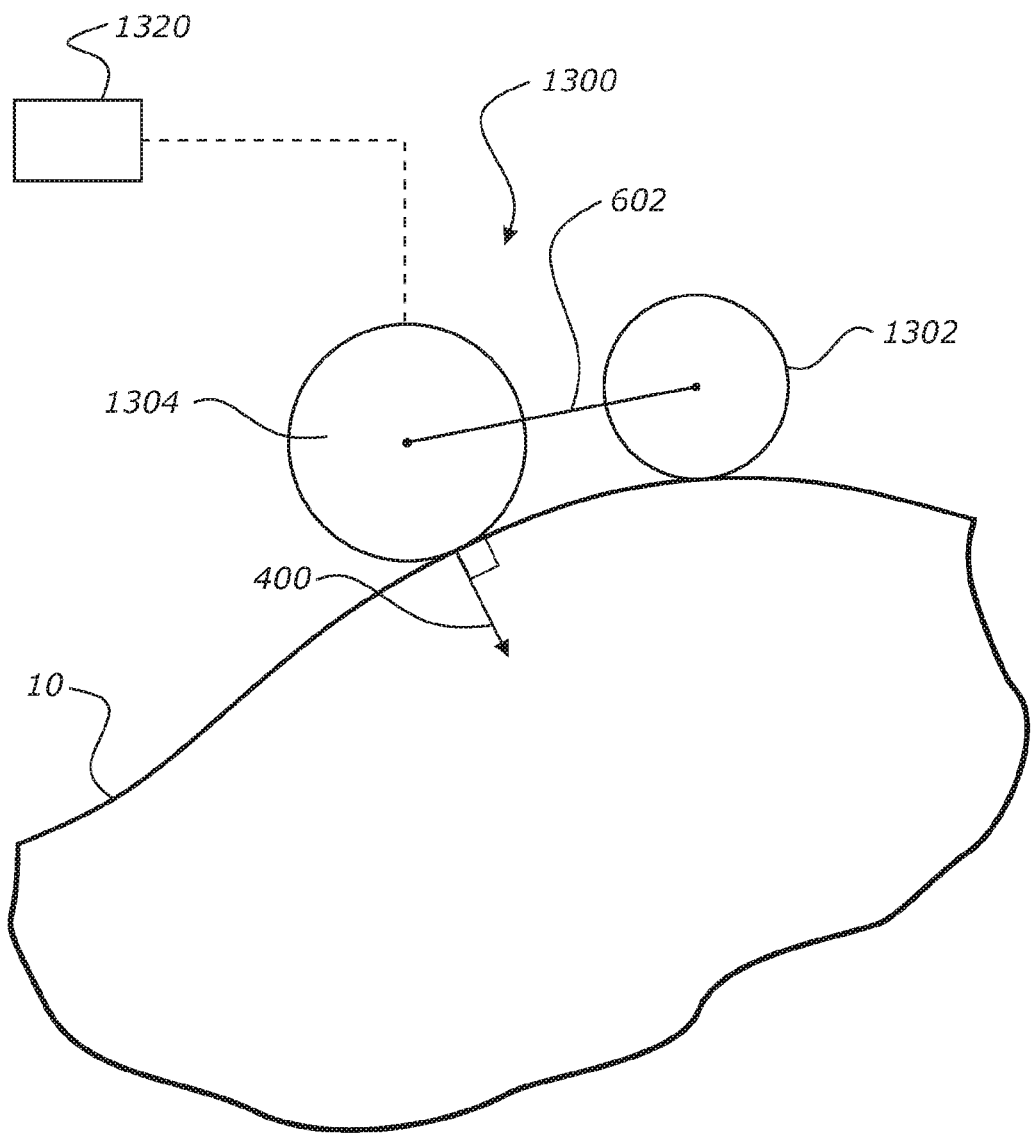
FIG. 13 shows a schematic view of an alternative embodiment of an edge modification apparatus that includes a sensing roller leading the pressure roller.

The linkage 906 is preferably a rigid linkage such as an arm or connecting rod. The linkage 906 is sufficiently long enough to space the cutter assembly 930 away from the pressure roller 902, such that the cutter assembly 930 does not collide with the pressure roller 902 during operation. In this alternative embodiment the edge modification apparatus 900 comprises a controller 920 that may be similar to the controller 220. The controller 920 may be a PLC or other suitable controller. As shown in FIG. 13, the controller is remote from the roller and cutter assembly but is in electrical communication with at least the cutter assembly 930. The controller 920 may also be arranged in electrical communication with position sensors associated with the roller. The position sensors are configured to determine the position of the roller in a global coordinate system. Alternatively the controller 920 may be mounted on the cutter assembly 930 or adjacent the roller 902.

The controller 920 may be configured to control a cutter assembly actuator to vary the torque applied to the cutter assembly to prevent collision between the cutter assembly 930 and the pressure roller 902. The controller 920 is configured to determine the position of the pressure roller 902 using position encoders and determine a differential position and angle of travel relative to a coordinate system using a similar process as that described earlier in reference to FIGS. 6A and 6B. The controller 920 is further configured to determine a desired force direction using the process described earlier with respect to FIGS. 6A and 6B. The desired force direction is calculated every time a position of the pressure roller 902 is sampled by suitable sensors e.g. position encoders. The force application arrangement (not shown) is controlled to apply a predetermined force, through the pressure roller 902, along the desired force direction that is calculated. The desired force direction is preferably substantially normal to the edge at a sampled position of the pressure roller 902. Using the method of FIGS. 6A and 6B is advantageous for the reasons described herein.

Figure 12:
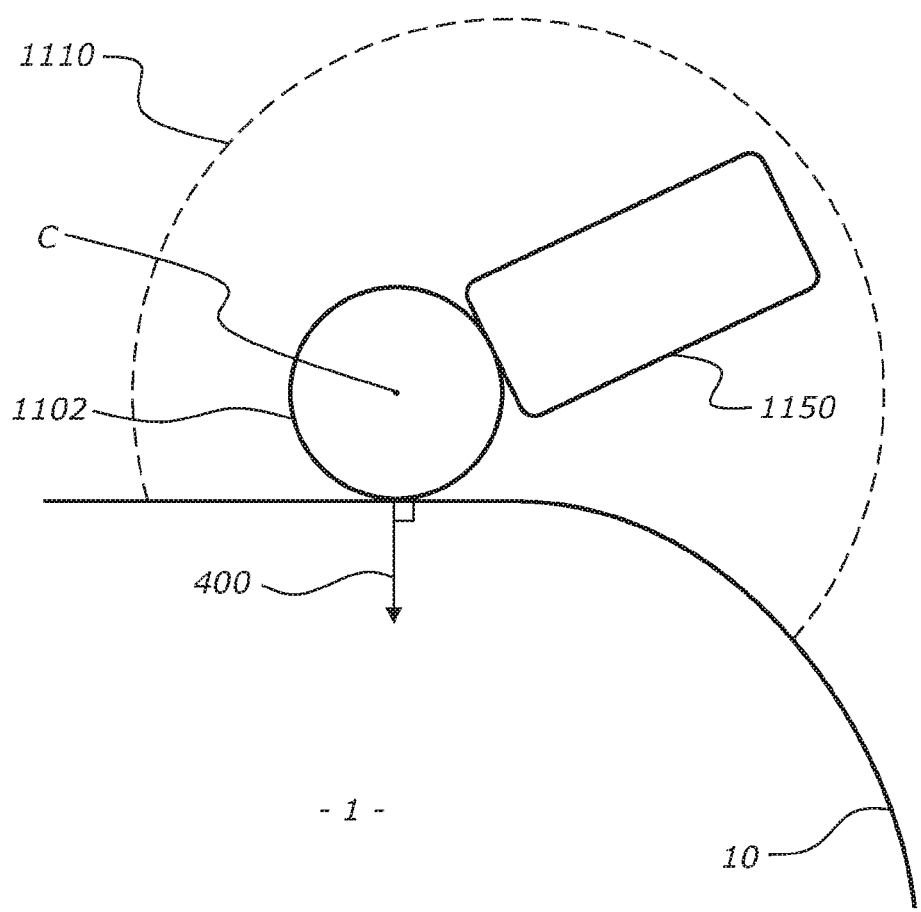
FIG. 12 shows an alternative embodiment of an edge modification apparatus that includes a pressure roller and a glue head only.

FIG. 12 shows an example of a further alternative embodiment of an edge modification apparatus 1100. The edge modification apparatus comprises a chassis 1110 and a contact roller 1102 that moves along the edge and a glue head 1150.

The contact roller 1102 is a pressure roller 1102 that is configured to exert a force against the edge along a desired force direction 400. The force along the desired force direction helps to adhere the edge tape or edge band to the edge. The magnitude of the force exerted by the pressure roller 1102 is a predetermined force such as for example 600 N or any other predetermined force. The magnitude of the force delivered may be based on a number of factors such as the dimensions of the edge tape or edge band or material of the edge tape or edge band, the type of glue used or any other factors.

The chassis 1110 may comprise most of the similar components from the edge modification apparatus 100. The edge modification apparatus comprises force application arrangement (i.e. first motor and second motor), a chassis driving device, and a driving motor to drive the pressure roller 1102. The glue head 1150 may be similar to the glue head 150 and can include similar components. The glue head at least includes a glue receptacle and one or more nozzles to apply glue to the edge band or edge tape.

The pressure roller 1102 is driven along the edge to apply a force to the edge and adhere an edge band or edge tape to the edge. The pressure roller is preferably driven about a C axis C (extending out of the page) by a suitable drive device such as a motor. The force application arrangement (not shown) comprises a pair of axial motors that each control the position of the roller 1102 relative to the edge and apply a force along a desired force direction. The apparatus 1100 shown in FIG. 13 is a simplified edge modification apparatus used to apply edge tape or edge band to the edge of an object. A hand held cutter assembly or a separate cutter assembly can be used to later cut or trim excess edge tape or edge band.

The illustrated apparatus 1100 includes a controller that is configured to determine a desired force direction based on a first and second position measurement of the pressure roller 1102. The pressure roller position 1102 is measured as it is driven along the edge of the object. A similar method to that described in FIGS. 6A and 6B is used to determine a vector angle and hence determine a desired force direction. The desired force direction is substantially normal to the edge. The apparatus applies a force via the pressure roller 1102 along the desired force direction. The apparatus 1100 implements the same method of determining desired force direction 400 and also benefits from the same advantages, as described later. A new desired force direction is calculated every time a new position is measured.

FIG. 13 shows a further alternative embodiment of the edge modification apparatus 1300. The edge modification apparatus 1300 may comprise some or all of the components of the edge modification apparatus 100 as described earlier. In the illustrated embodiment the apparatus 1300 also comprises an additional separate sensing roller 1302 that precedes the pressure roller 1304. The contact roller here is the sensing roller 1302. Referring to FIG. 13, the sensing roller 1302 is connected to the pressure roller 1304 by a coupling arm 602. The coupling arm 1306 may pivot relative to the pressure roller 1304. The sensing roller 1302 may be a driven roller that is driven by a drive unit such as a motor or an actuator, or may be a free spinning roller. Preferably the sensing roller is also driven by a C axis motor that is similar to the C axis motor described earlier. Preferably the C axis motor drives the sensing roller 1302 and the pressure roller 1304.

The sensing roller 1302 may be mechanically coupled to the pressure roller by a belt or a chain such that the pressure roller 1304 and the sensing roller 1302 may be co-driven. The sensing roller 1302 may also provide a small force to bias the sensing roller against the edge in order to maintain the sensing roller 1302 in contact with the edge. Alternatively the sensing roller 1302 may be coupled to its own actuator that biases the sensing roller 1302 against the edge 10 and the actuator being controlled by the controller 1320. In this configuration the sensing roller 1302 can be used to determine a desired force direction based on vector angle.

Preferably one or more position sensors e.g. encoders are used to detect the position of the sensing roller 1302. A vector angle can be calculated between a first position and second position of the sensing roller 1302 using the method shown FIGS. 6A and 6B. A desired force direction is calculated by the controller 1320 based on the vector angle. A force is applied by the pressure roller 1304, when the pressure roller reaches the second position. A force direction is calculated at every new position of the sensing roller 1302 that is measured, by the controller. The controller is configured to determine a force direction that is substantially normal to the edge object based on the position of the sensing roller 1302. The controller 1320 uses a predefined delay based on a known distance between the sensing roller 1302 and the pressure roller 1304 when controlling the force application arrangement. In this embodiment a force direction is calculated and the force application is delayed by a known or predetermined delay i.e. when the pressure roller reaches the position in which the sensing roller was measured.

The present invention provides for a more accurate measurement/determination of the position of the pressure roller 202 as it moves along the edge 10. The present invention further provides a method to calculate a desired force direction that is substantially normal and applying a force along the calculated force direction thereby reducing any wasted force applied in other directions. The substantially normal force is determined based on the vector angle of the pressure roller 202. The force direction throughout the journey of the pressure roller 202 is substantially normal thereby providing improved force for adhering the edge tape or edge band to the edge.

The described embodiments of the edge modification apparatus are advantageous because an accurate normal force direction is determined and a force is applied along the normal force direction on the fly without requiring complex sensing mechanisms or without requiring pre-knowledge of the edge profile. Several prior art systems use a known map or known edge profile that is stored in a memory unit. These systems are expensive to use, limited to the stored edge profiles and also can be cumbersome to use due to the constant programming required when a new panel or new object having a different edge profile is required to be processed.

The presently described apparatus embodiments and method of edge modification based on the vector angle and/or differential position is also advantageous because it results in a more accurate determination of a desired force direction that more closely approximates a normal to the edge at a position. This allows for a more force to be delivered along a more accurate force direction, all without needing to know the shape of the work piece or without needing to line up the work piece to a known reference. On the other hand at least some prior art systems that use sensors still provide an inaccurate normal force direction due to assumptions that are made when determining a relationship between a sensor and the actual pressure roller.

The detection of a corner is more accurate thereby reducing the magnitude of any additional drive forces on the pressure roller (i.e. bias forces) required to pull the trailing roller and the cutter assembly around the corner. The described method of edge modification and in particular calculating a desired force direction that is substantially normal based on a vector angle and/or differential position of the pressure roller allows for more accurate tracking of the pressure roller around corners and a more accurate normal force to be applied. The presently described method allows the pressure roller to be driven faster around corners thereby reducing overall processing time for a panel. The presently described method of determining a new force direction based on the position of the pressure roller reduces the need for human intervention and further automates the process. In prior art systems a human often needed to intervene at corners e.g. during sharp corners to ensure the edge tape is adhered with minimal error. The present invention is advantageous because it can automatically determine the presence of a corner and automatically make adjustments to the direction of the force applied by the pressure roller.

Further the system can automatically adjust the torque on a trailing roller and the cutter assembly in order to reduce drag from these components. The present invention allows for a simpler machine construction without the need for complex sensing systems or systems including complex arrangements of leading and following rollers. The present invention does not require a complex controller that is required to determine normal force directions based on compensating for complex sensing arrangements. The present invention allows for a simpler controller that determines a normal force direction based on the differential position and/or differential angle as the pressure roller or a single sensing roller moves along the edge. There controller does not require complex mathematical equations to determine resultant vectors based on the orientation of complex sensing mechanisms and arrangements.

The present invention provides for a more accurate force from the pressure roller i.e. the force applied is more consistently normal to the edge thereby improving the adherence of the edge tape, reducing the tape slipping, bunching and peeling away from the edge due to non-normal forces. This improves the finish of the tape on the edge and allows for faster processing. The present invention provides for simpler control of the pressure roller and other components of the edge modification apparatus again without the need for various compensations due to the complex nature of many prior art edge modification machines.

The simpler control therefore allows for a cheaper edge modification apparatus (i.e. edge modification machine) to be produced. The presently described method of applying force based on the position of a contact roller e.g. a pressure roller is advantageous because it allows the edge modification apparatus to operate with a wider range of edge tapes of greater range of sizes, materials and material properties such as stiffness. The edge modification apparatus as described herein is configured to apply a more accurate normal force to the edge thereby increasing the types of edge tapes the edge modification apparatus can successfully apply to an edge of a panel. The edge modification apparatus may have a similar construction as that disclosed in that applicants previously filed applications WO02/14033 and WO2004/106063. These applications are wholly herein incorporated by reference. The construction of these edge modification apparatuses includes at least a contact roller, e.g. a pressure roller. A controller of these known edge modification apparatuses may be configured to apply the method of determining desired force direction and applying a force along the desired force direction based on the changing position of the contact roller. In particular the desired force direction may be calculated at one or more positions based on a vector angle as described herein, such that the desired force direction is substantially normal to the vector angle, and hence is also substantially normal or close to normal to a position along the edge.

The apparatus 100 as described herein and in particular the use of the pressure roller and control of the apparatus based on the differential position of the pressure roller can be used in other applications other than edge banding. For example the apparatus may be used in sanding edges, wherein the pressure roller may be substituted for a sanding roller and the method of determining normal force can be applied by a suitable controller based on the differential position of the sanding roller such that an appropriate force is applied by the sanding roller, substantially normal to the edge, to allow efficient sanding of the edge. Other applications for edge modification using the apparatus and method of control described herein are also contemplated.

Preferred embodiments of the invention have been described by way of example only and modifications may be made thereto without departing from the scope of the invention.

The invention claimed is:

1. A method of edge modification to modify an edge of an object comprising:
    placing a roller in contact with an edge of the object,
    determining co-ordinates of a first position of the roller,
    moving the roller along the edge from the first position to a second position,
    determining co-ordinates of the second position of the roller,
    calculating a desired force direction from the first position co-ordinates and the second position co-ordinates, wherein the desired force direction is calculated from a vector angle between the first position and the second position of the roller,
    applying a force, by a pressure roller, along the desired force direction at the second position and modifying the edge of the object.

2. A method of edge modification according to claim 1, wherein the roller is the pressure roller.

3. A method of edge modification according to claim 1, wherein the desired force direction is calculated by adding or subtracting a transform value to the vector angle.

4. A method of edge modification according to claim 3, wherein the transform value is such that the desired force direction is substantially normal the vector angle.

5. A method of edge modification according to claim 1, wherein the vector angle is calculated from a differential position between the second position and the first position.

6. A method of edge modification according to claim 1, wherein a new position of the roller is sampled at regular intervals as the roller is moved along the edge, wherein the regular interval is less than or equal to approximately 5 mm.

7. A method of edge modification according to claim 1, wherein said method includes applying an edge band to said edge.

8. An edge modification apparatus to modify an edge of an object comprising:
    a fixed structure to which the object is mounted,
    a chassis,
    a force application arrangement coupled to the chassis and arranged to move the chassis relative to the object,
    a roller assembly mounted to the chassis, the roller assembly including a roller, placed in contact with an edge of the object and moveable along the edge of the object,
    an electronic controller configured to:
        determining co-ordinates of a first position of the roller,
        cause the roller to move along the edge from a first position to a second position,
        determining co-ordinates of a second position of the roller,
        calculate a desired force direction from the first position co-ordinates and the second position co-ordinates, by calculating the desired force direction from a vector angle between the first position and the second position of the roller,
        control the force application arrangement to apply a force, by a pressure roller, along the desired force direction at the second position to modify the edge of the object or position a tool to the edge of the object to modify the edge of the object.

9. An edge modification apparatus according to claim 8, wherein the roller is the pressure roller.

10. An edge modification apparatus according to claim 8, wherein the controller is configured to calculate the desired force direction by adding or subtracting a transform value to the vector angle.

11. An edge modification apparatus according to claim 8, wherein the controller is configured to calculate the vector angle from a differential position between the second position and the first position.

12. An edge modification apparatus according to claim 8, wherein the controller controls the force application arrangement to cause the pressure roller to apply a predetermined force along the desired force direction.

13. An edge modification apparatus according to claim 8, comprising:
    one or more position sensors configured to sense the position of the roller as the roller moves along the edge,
    the one or more position sensors in electronic communication with the controller and transmitting the sensed position to the controller,
    the one or more position sensors sensing the position of the roller at regular intervals, wherein the regular interval is less than or equal to approximately 5 mm.

14. An edge modification apparatus according to claim 13, wherein the controller calculating the desired force direction at each new sensed position of the roller.

15. An edge modification apparatus according to claim 8, further comprising:
    a roller drive device in electronic communication with the controller and coupled to the roller to drive the roller along the edge at a predetermined speed,
    wherein the controller is further configured to:
        detect a non linear section of the edge of the object, control the roller drive device to adjust the speed of the roller based on the detected non linear section of the edge.

16. An edge modification apparatus according to claim 15, wherein the controller is configured to detect the non-linear section of the edge based on a change in the vector angle or desired force direction or a rate of change of the vector angle as the roller moves along the non-linear section.

17. An edge modification apparatus according to claim 8, wherein the roller is a sensing roller, and the roller assembly comprises:
   the sensing roller and the pressure roller;
   the sensing roller is spaced apart from and preceding the pressure roller,
   the sensing roller configured to move along the edge from the first position to the second position,
   the controller controlling the force application arrangement to apply a predetermined force by the pressure roller along the desired force direction when the pressure roller is at the second position.

18. An edge modification apparatus according to claim 8, wherein the roller assembly comprises:
   a trailing roller,
   the trailing roller depending from the pressure roller and pivotable relative to the pressure roller, and;
   the trailing roller applying a contact force to the edge.

* * * * *